United States Patent
Fujii et al.

(10) Patent No.: US 7,609,752 B2
(45) Date of Patent: Oct. 27, 2009

(54) TRANSMITTER AND TRANSMISSION CONTROL METHOD USED IN RANDOM ACCESS COMMUNICATION ENVIRONMENT

(75) Inventors: Hiromasa Fujii, Yokosuka (JP); Hitoshi Yoshino, Yokosuka (JP); Takatoshi Sugiyama, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 645 days.

(21) Appl. No.: 11/365,532

(22) Filed: Mar. 2, 2006

(65) Prior Publication Data

US 2006/0198455 A1    Sep. 7, 2006

(30) Foreign Application Priority Data

Mar. 2, 2005    (JP) .............................. 2005-058086

(51) Int. Cl.
*H04L 27/30* (2006.01)
(52) U.S. Cl. ..................... 375/145; 375/146; 375/366; 375/368; 370/468; 370/480; 370/509
(58) Field of Classification Search ................ 375/140, 375/141, 145–147, 219, 260, 267, 295, 362, 375/364, 366, 368, 149; 370/203, 236.1, 370/236.2, 319–321, 342, 343, 350, 441, 370/442, 464, 465, 468, 474–480, 482, 491, 370/500, 503, 509, 512
See application file for complete search history.

(56) References Cited

U.S. PATENT DOCUMENTS

| | | | | |
|---|---|---|---|---|
| 6,424,678 | B1 * | 7/2002 | Doberstein et al. | 375/260 |
| 6,487,252 | B1 * | 11/2002 | Kleider et al. | 375/260 |
| 6,904,550 | B2 * | 6/2005 | Sibecas et al. | 714/714 |
| 7,460,466 | B2 * | 12/2008 | Lee et al. | 370/208 |
| 2003/0214927 | A1 * | 11/2003 | Atarashi et al. | |
| 2007/0133386 | A1 * | 6/2007 | Kim et al. | |

OTHER PUBLICATIONS

M. Julia Fernandez-Getino Garcia, et al., "DFT-based Channel Estimation in 2D-Pilot-Symbol-Aided OFDM Wireless Systems", Proc. of IEEE VTC 2001, 2001, pp. 810-814.

* cited by examiner

*Primary Examiner*—Dac V Ha
(74) *Attorney, Agent, or Firm*—Oblon, Spivak, McClelland, Maier & Neustadt, L.L.P.

(57) ABSTRACT

A transmitter comprises a frequency utilization status detector configured to detect the utilization status of an allocated frequency band based on a received signal, a symbol placement determination unit configured to determine placement of pilot symbols based on the detected status of frequency utilization, and a symbol placement unit configured to place the pilot symbols according to the determined symbol placement.

24 Claims, 30 Drawing Sheets

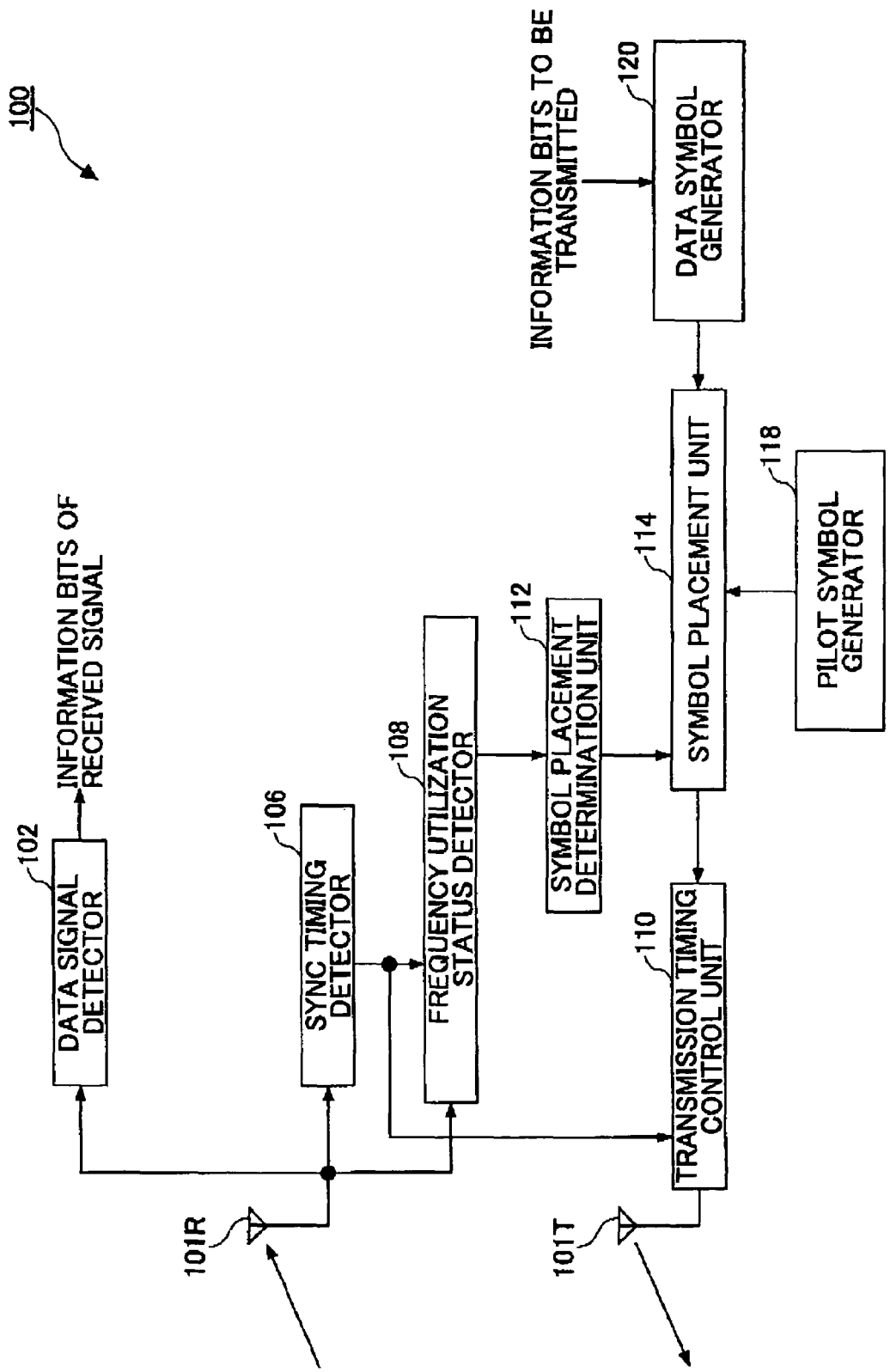

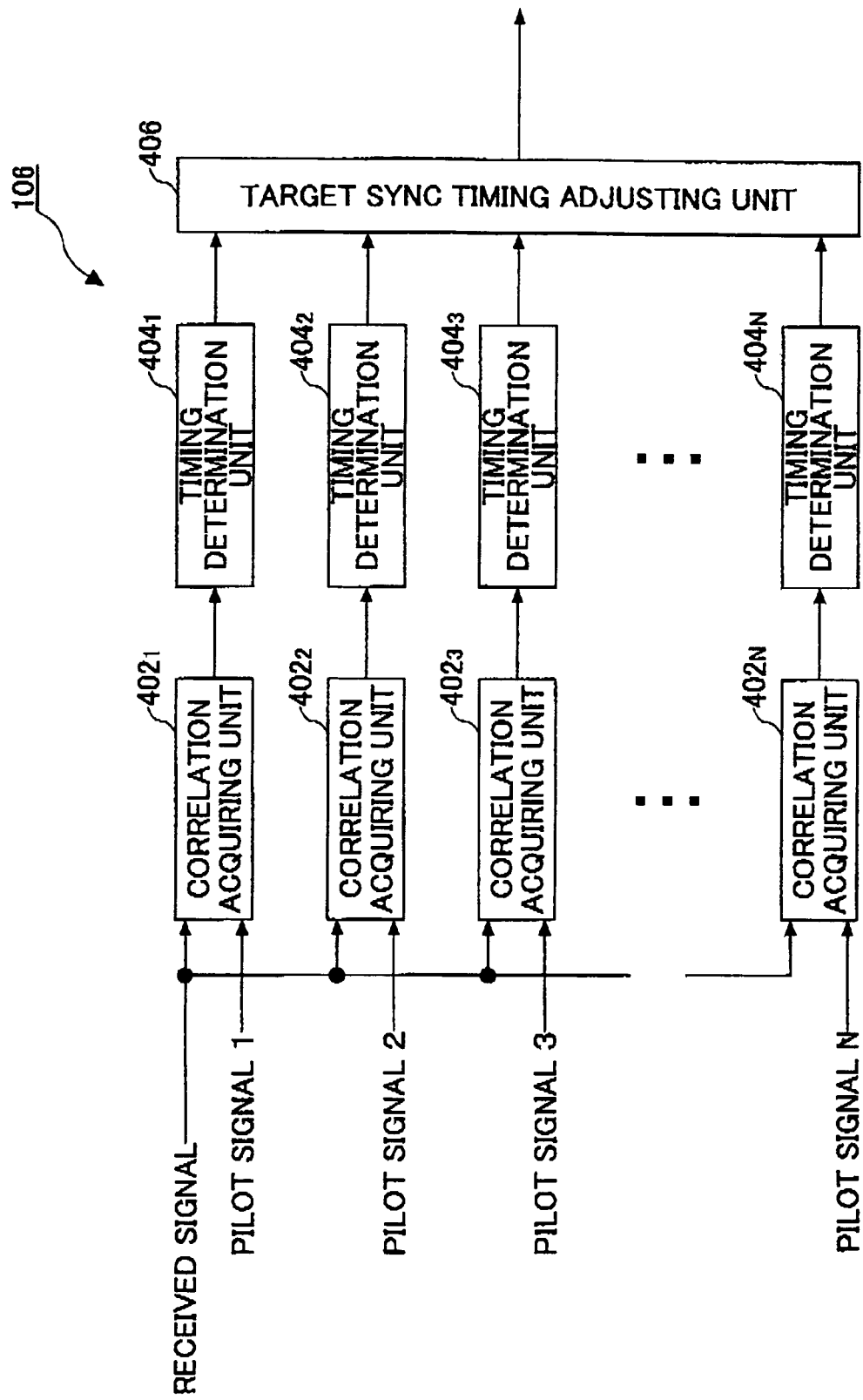

FIG.8
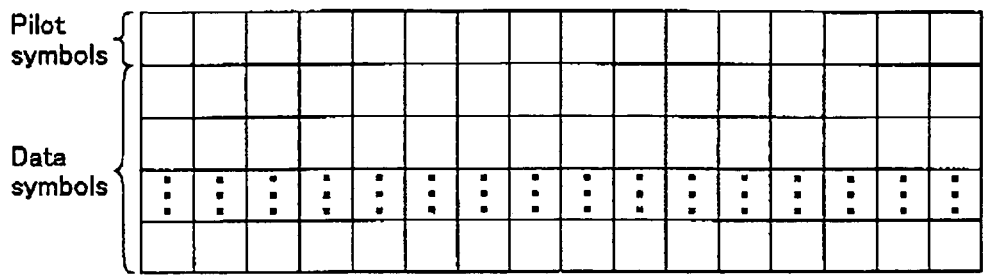
(a)
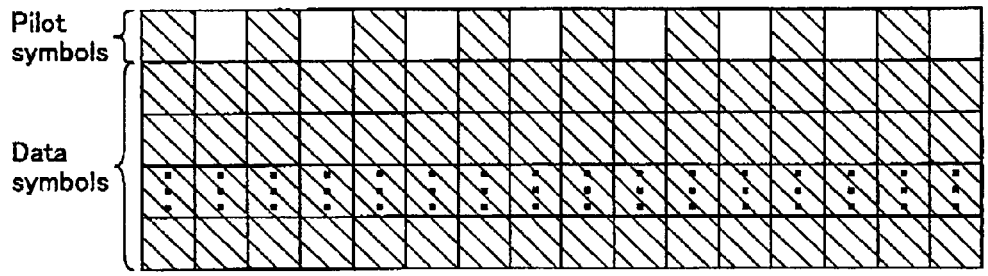
(b)
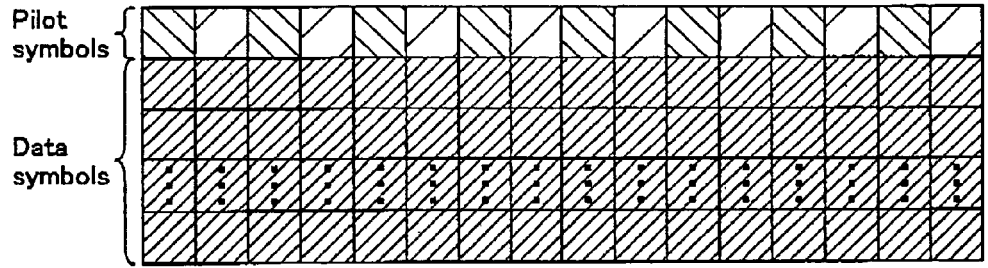
(c)
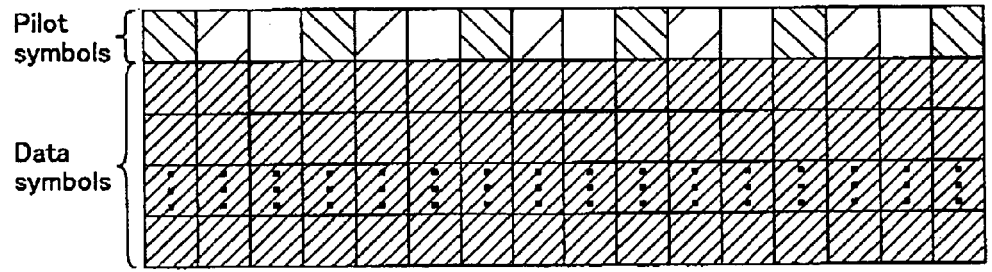
(d)
| | Null symbols | | Occupied with symbols of terminal B |
|---|---|---|---|
|  | Occupied with symbols of terminal A |  | Occupied with symbols of terminal A & B |

FIG.10
(a)
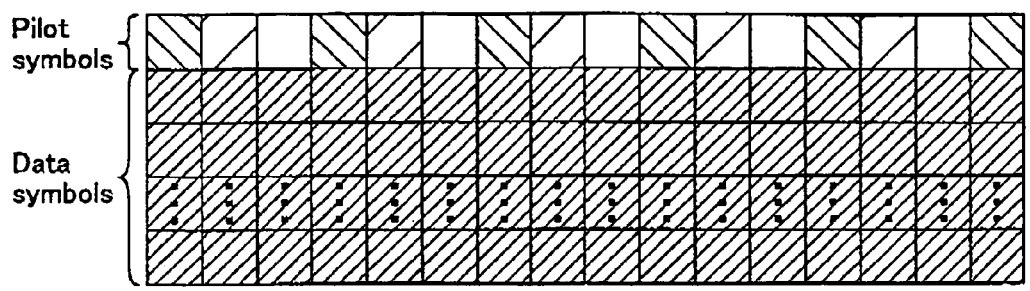
(b)
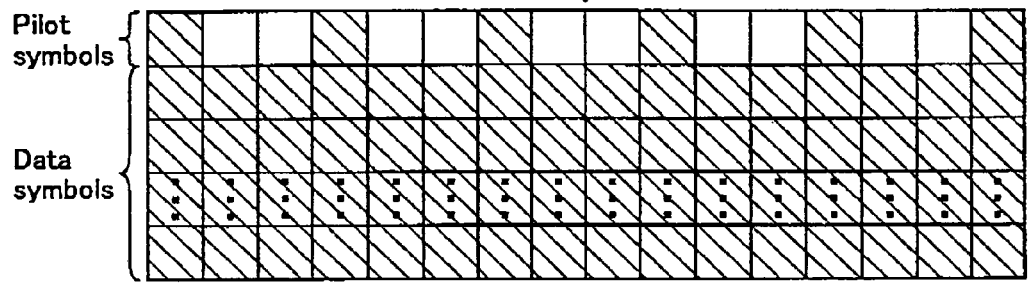
(c)
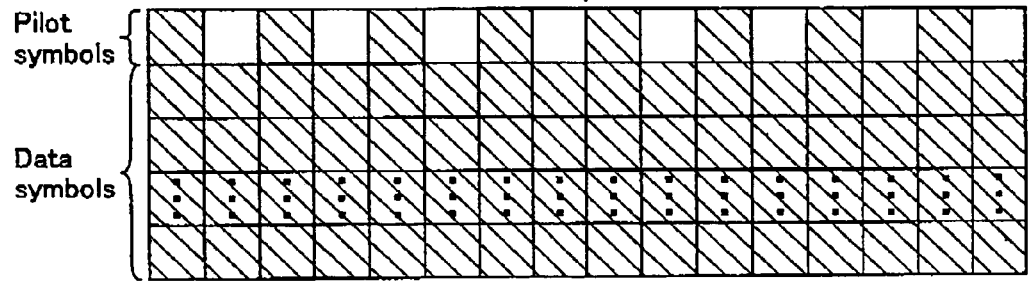
| □ Null symbols |  Occupied with symbols of terminal B |
|---|---|
|  Occupied with symbols of terminal A |  Occupied with symbols of terminal A & B |

FIG.11
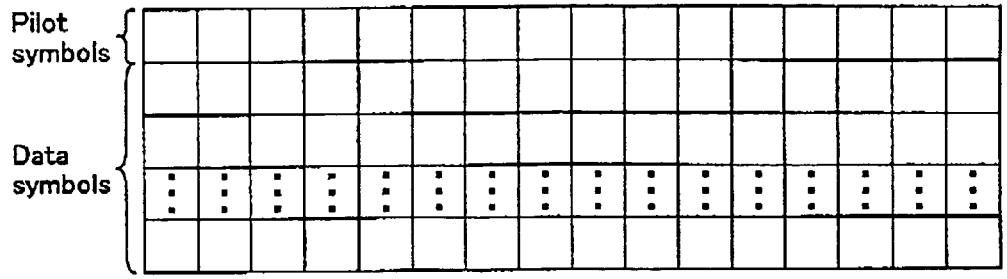
(a)
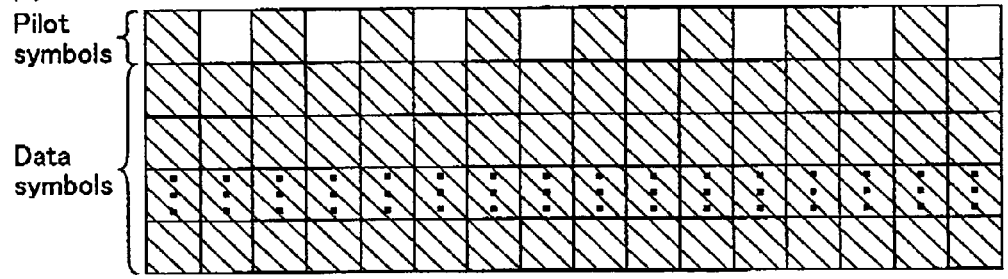
(b)
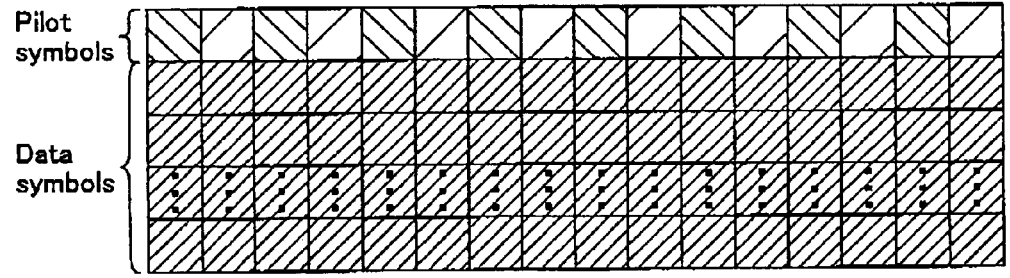
(c)
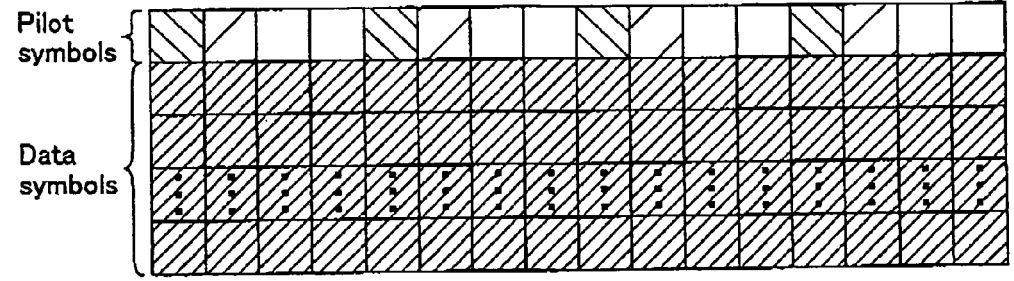
(d)
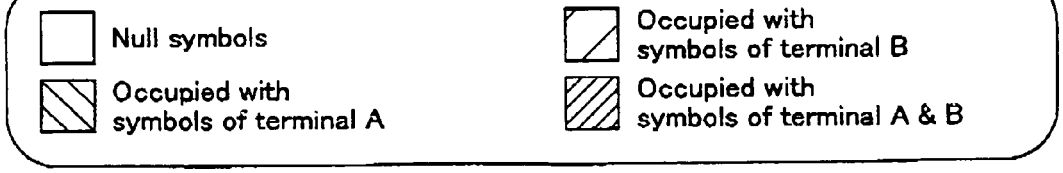

FIG.14
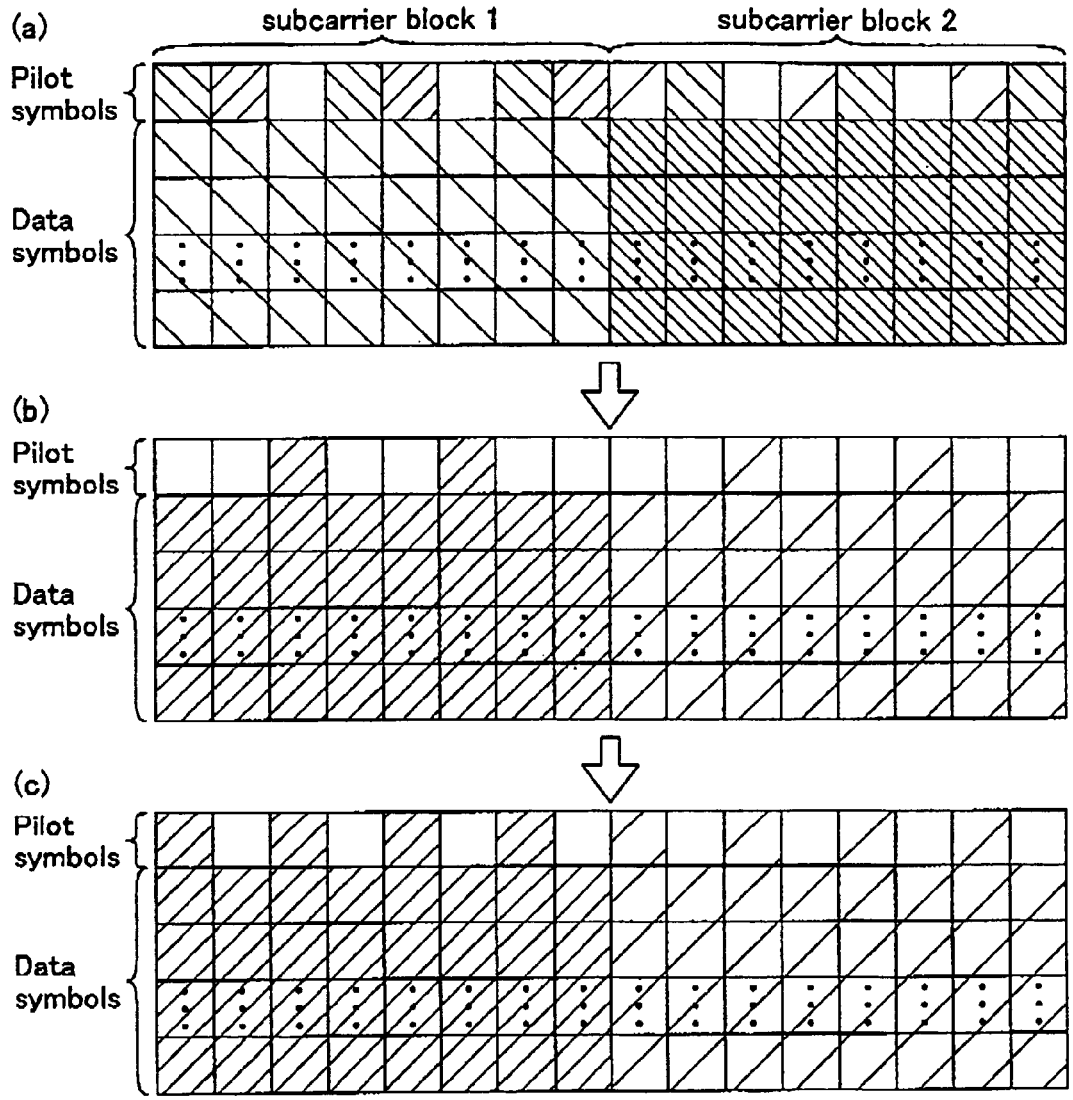
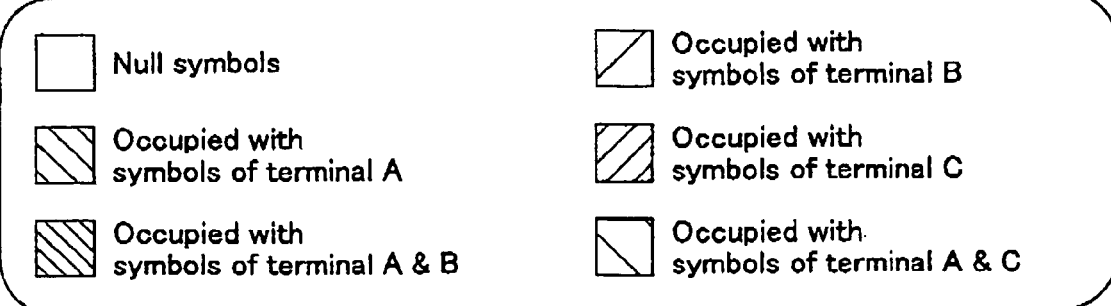

FIG.15
(a)
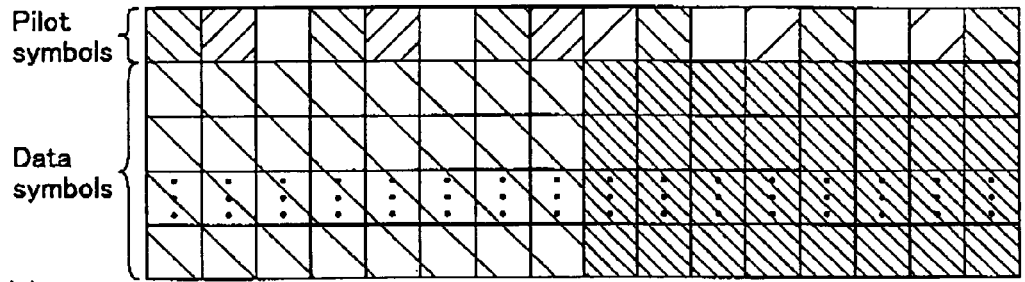
(b)
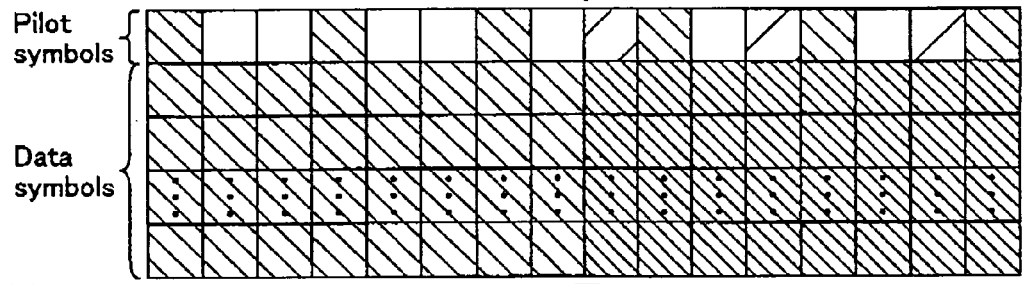
(c)
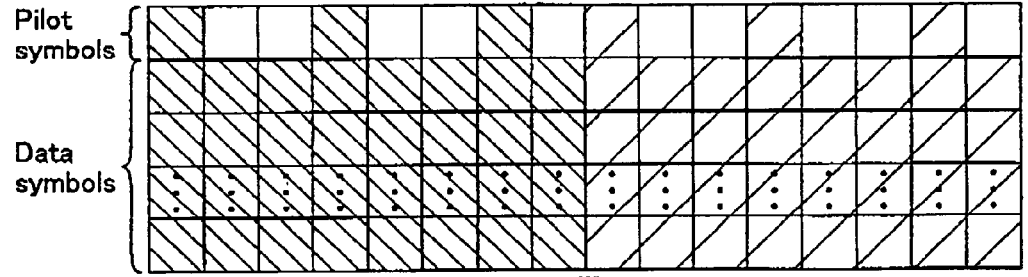
(d)
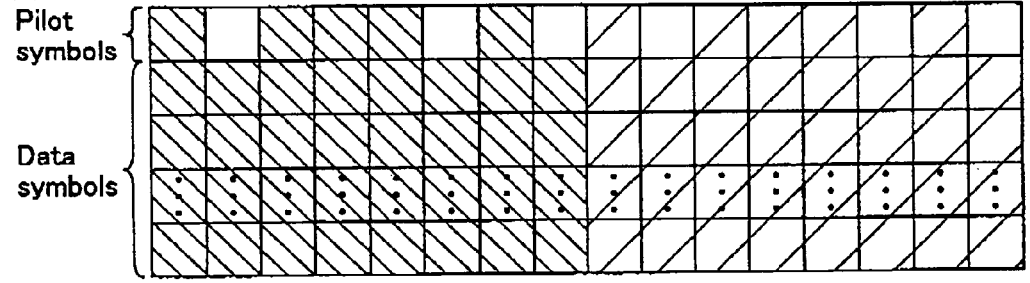
| | | | |
|---|---|---|---|
|  Null symbols | |  Occupied with symbols of terminal B | |
|  Occupied with symbols of terminal A | |  Occupied with symbols of terminal C | |
|  Occupied with symbols of terminal A & B | |  Occupied with symbols of terminal A & C | |

FIG.16
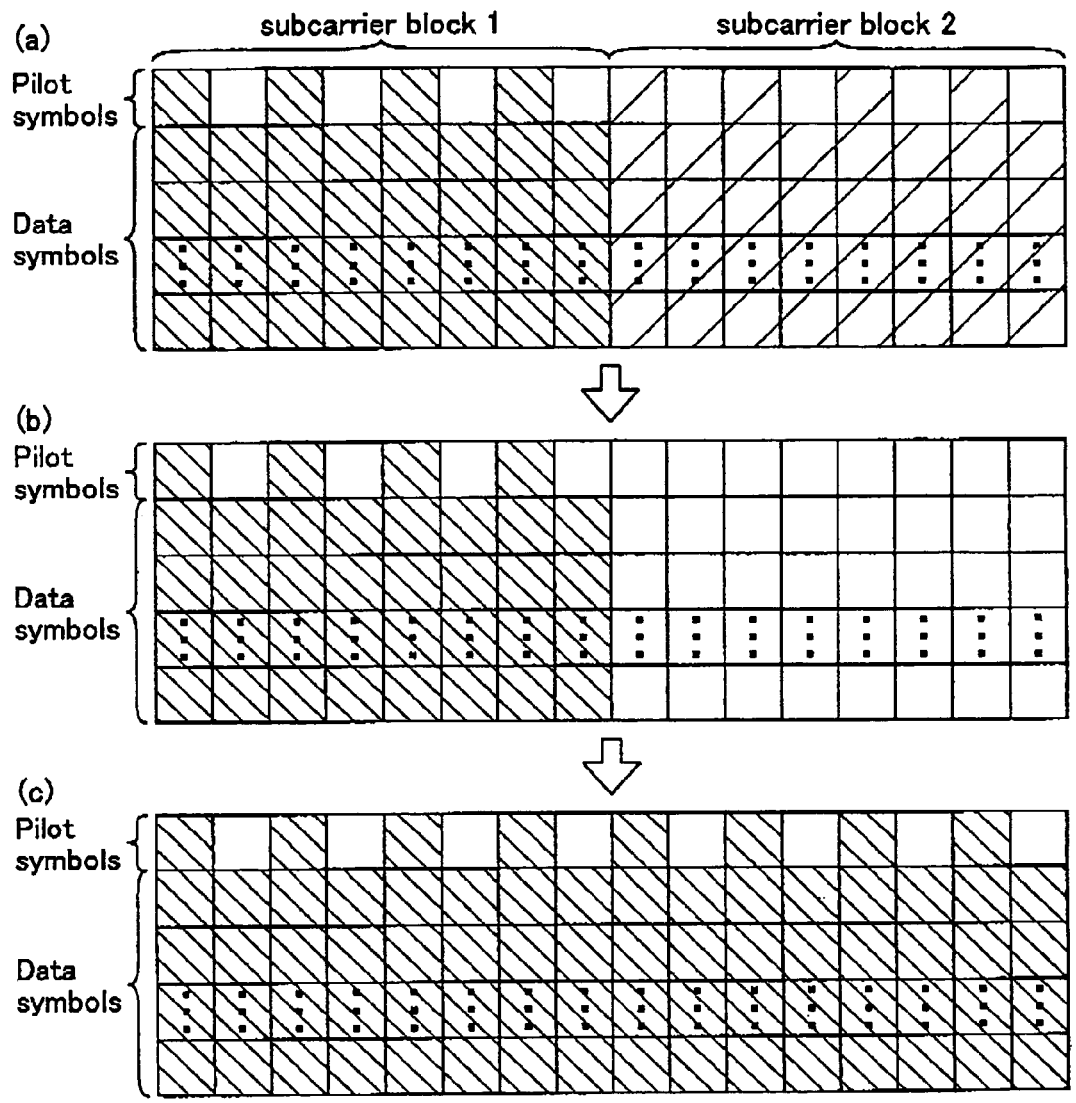
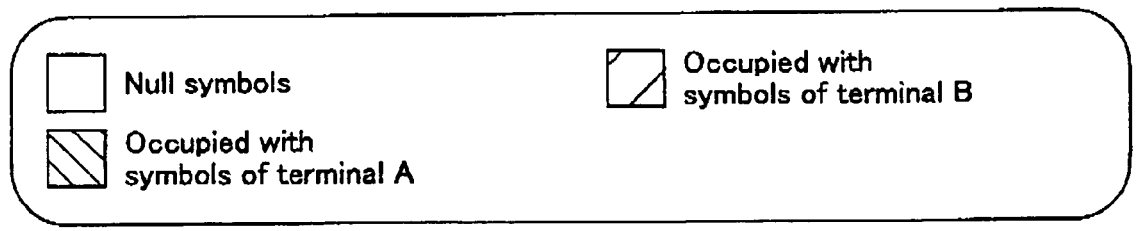

FIG.17
(a)
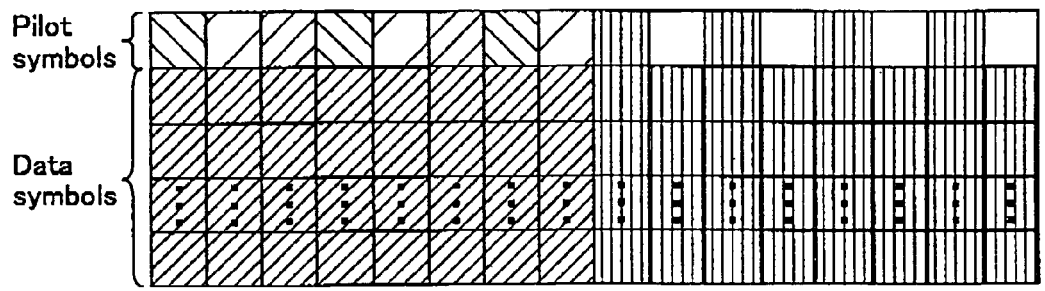
(b)
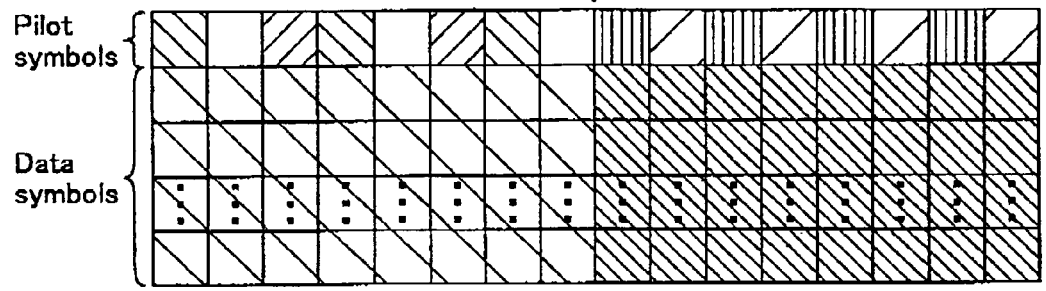
(c)
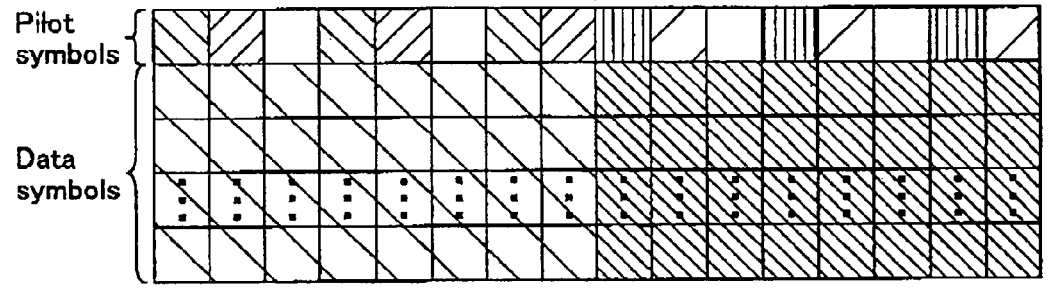
| | | | |
|---|---|---|---|
|  Null symbols | | | |
|  Occupied with symbols of terminal A | |  Occupied with symbols of terminal B | |
|  Occupied with symbols of terminal C | |  Occupied with symbols of terminal D | |
|  Occupied with symbols of terminal B & D | |  Occupied with symbols of terminal A & C | |
|  Occupied with symbols of terminal A & B & C | | | |

FIG.18
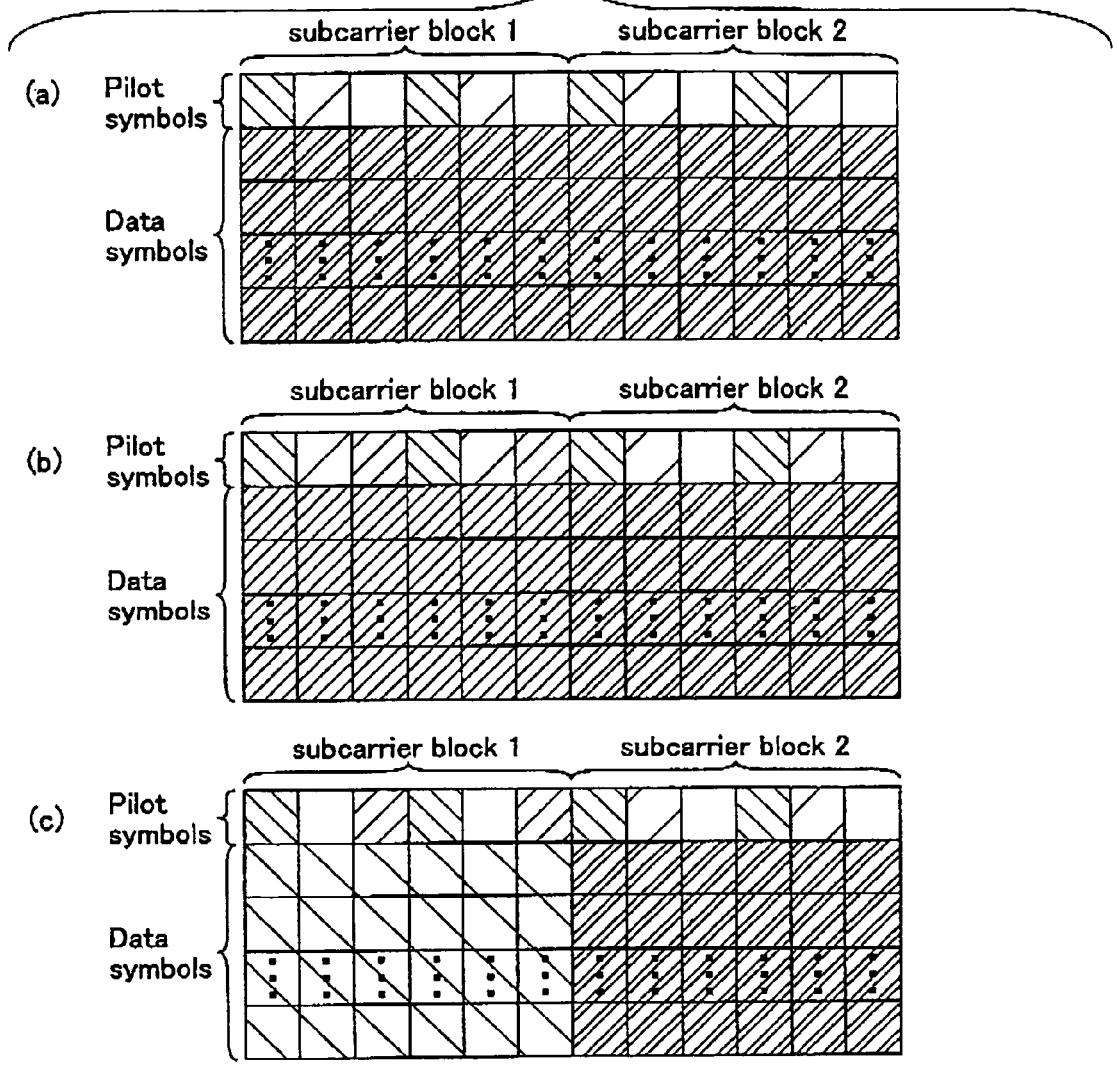
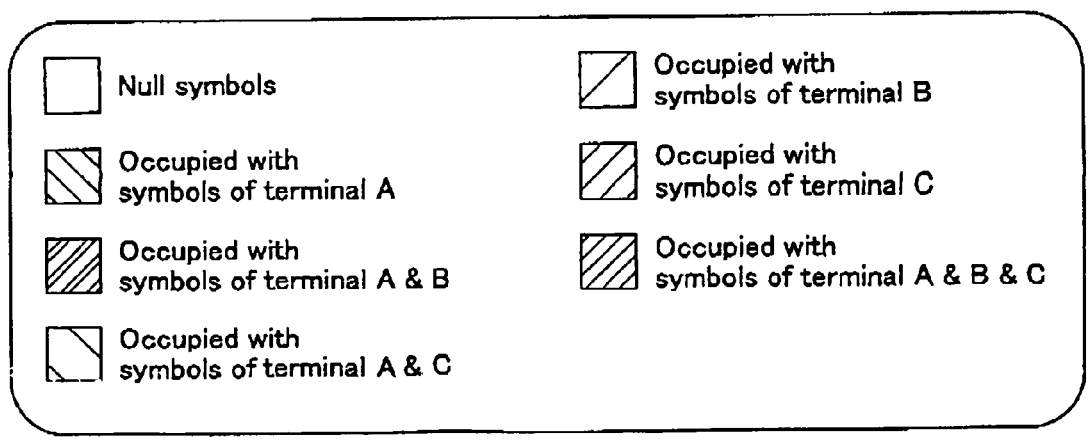

FIG. 19
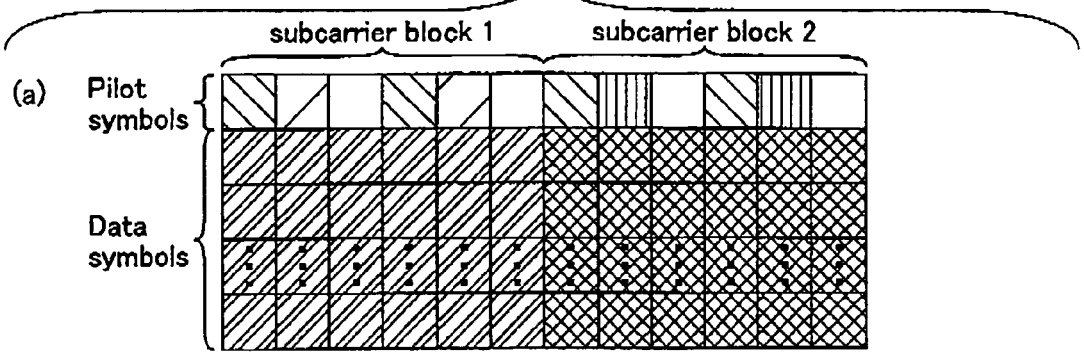
(a)
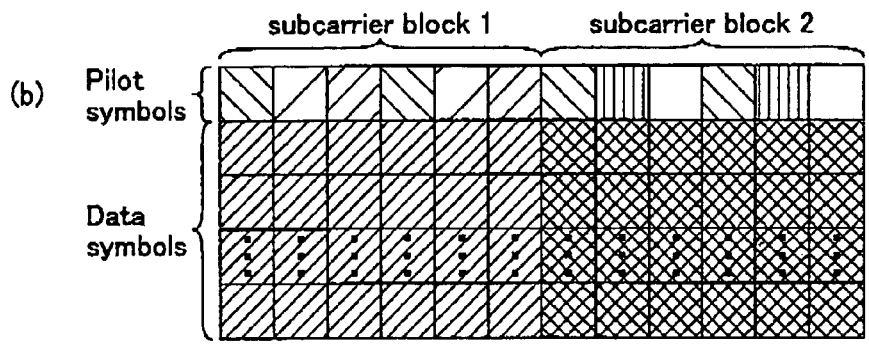
(b)
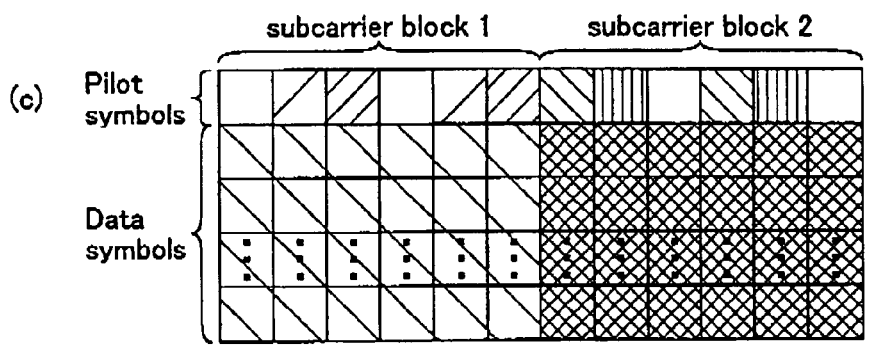
(c)
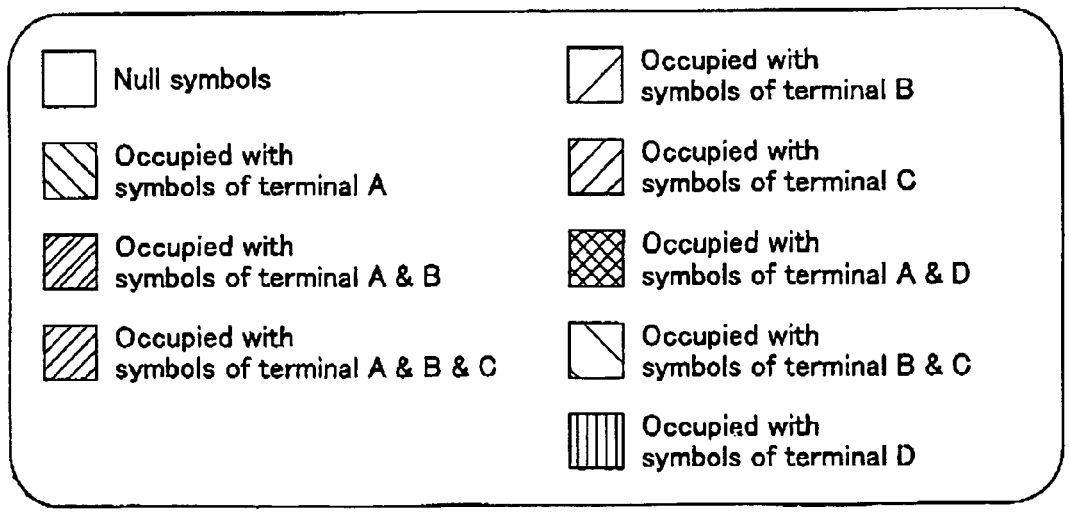

FIG. 20
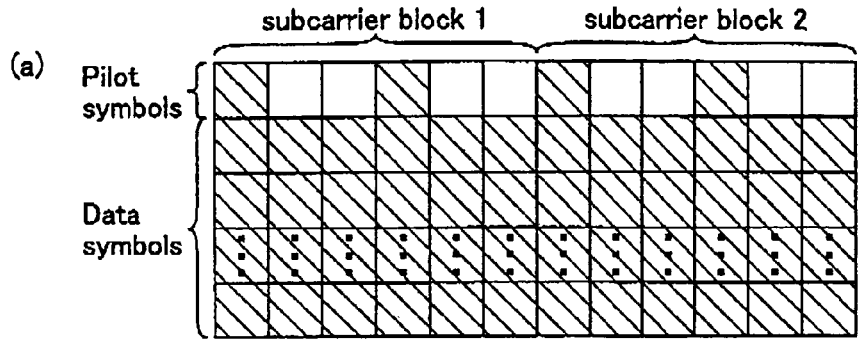
(a)
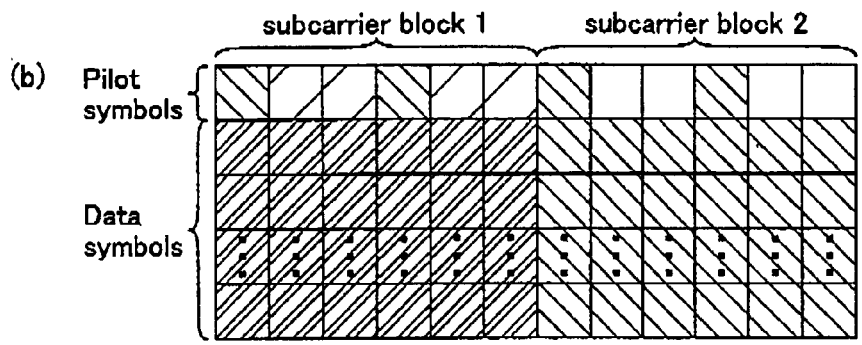
(b)
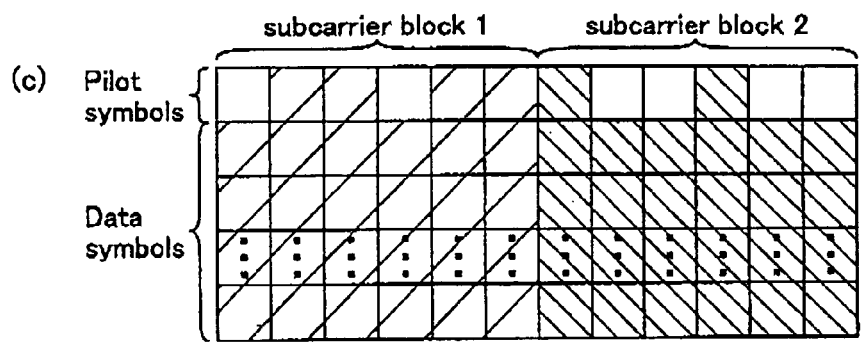
(c)
- ☐ Null symbols
-  Occupied with symbols of terminal A
-  Occupied with symbols of terminal A & B
-  Occupied with symbols of terminal B

TRANSMITTER AND TRANSMISSION CONTROL METHOD USED IN RANDOM ACCESS COMMUNICATION ENVIRONMENT

FIELD OF THE INVENTION

The present invention relates to a transmitter and a transmission control method used in the mobile communication environment of a random access type.

BACKGROUND OF THE INVENTION

One of communication schemes for allowing multiple transmitters/receivers to share a frequency band is carrier sense multiple access with collision avoidance (CSMA/CA) used in wireless LANs. In CSMA/CA, the interference level is measured to detect whether other users are conducting wireless communications prior to starting data transmission. If it is determined that other users are not conducting wireless communication, data transmission is started. If packet collision is detected, transmission is restarted after a time interval determined at random.

FIG. 1 is a schematic block diagram of a CSMA/CA transmitter/receiver 1. The CSMA/CA transmitter/receiver 1 has a receiving antenna, a data signal detector 2 connected to the receiving antenna, and a received power level measuring unit 4 connected to the receiving antenna parallel to the data signal detector 2. The CSMA/CA transmitter/receiver 1 also has a transmission antenna, a transmission availability control unit 6 connected to the transmission antenna and the received power level measuring unit 4, a multiplexer, a data symbol generator 10 connected to the multiplexer 8, and a pilot symbol generator 12 connected to the multiplexer 8 parallel to the data symbol generator 10. The data signal detector 2 outputs information bits of the received signal. Information bits to be transmitted are input to the data symbol generator 10.

The data signal detector 2 detects a data signal received at the receiving antenna to output the received information bits. The received power level measuring unit 4 measures the power level of the received data signal, and supplies the measurement result to the transmission availability control unit 6.

The data symbol generator 10 generates a data symbol sequence based on the information bits to be transmitted, and supplies the generated data symbol sequence to the multiplexer 8. The multiplexer 8 superimposes the data symbol sequence on the pilot symbol sequence generated by and supplied from the pilot symbol generator 12, and supplies the superimposed symbol sequence to the transmission availability control unit 6. The transmission availability control unit 6 allows the superimposed symbol sequence to be transmitted immediately from the transmission antenna if it is determined that other users are not conducting radio communication. If it is determined that other users are conducting radio communication, then the transmission availability control unit 6 allows the superimposed symbol sequence to be transmitted after a prescribed time interval.

However, the above-described conventional technique has some problems. With a CSMA/CA scheme used in wireless LANS, if a user is using a frequency band, the other user cannot conduct radio communication. Consequently, large delay is likely to occur in real-time communications or stream transmission.

In addition, if there are many users simultaneously using the frequency band, an undesirable situation where a certain user cannot communicate for a long time occurs. By restricting interference excessively, the overall communication capacity of the entire system may be reduced.

SUMMARY OF THE INVENTION

Therefore, it is an object of the present invention to provide a transmitter and a transmission control method that reduces delay generated in each packet in the random access communication environment.

In one aspect of the invention, a transmitter comprises a frequency utilization status detector configured to detect utilization status of an allocated frequency band based on a received signal; a symbol placement determination unit configured to determine placement of pilot symbols based on the detected status of the frequency utilization; and a symbol placement unit configured to place the pilot symbols according to the determined symbol placement.

In another aspect of the invention, a transmission control method comprises the steps of:

(a) receiving a signal from a transmitter that is currently conducting radio communication nearby;

(b) detecting the utilization status of the allocated frequency band based on the received signal;

(c) determining placement of pilot symbols based on the detected utilization status; and (d) placing the pilot symbols based on the determination result.

The above-described arrangement allows a user to start communications even if other users are using the allocated frequency band in the random access communication environment.

In a preferred embodiment, a transmitter and a transmission control method that can reduce delay occurring at each packet in the random access communication environment is provided.

BRIEF DESCRIPTION OF THE DRAWINGS

Other features and advantages of the invention will become more apparent from the following detailed description when read in conjunction with the accompanying drawings, in which

FIG. 3 is a schematic block diagram of a transmitter/receiver according to an embodiment of the invention;

FIG. 4 is a schematic block diagram of the synchronization timing detector used in the transmitter/receiver shown in FIG. 3;

FIG. 8 illustrates another example of the frame structure according to an embodiment of the invention;

FIG. 10 illustrates still another example of the frame structure according to an embodiment of the invention;

FIG. 11 illustrates yet another example of the frame structure according to an embodiment of the invention;

FIG. 14 is yet another example of the frame structure according to an embodiment of the invention;

FIG. 15 is yet another example of the frame structure according to an embodiment of the invention;

FIG. 16 is yet another example of the frame structure according to an embodiment of the invention;

FIG. 17 is yet another example of the frame structure according to an embodiment of the invention;

FIG. 18 is yet another example of the frame structure according to an embodiment of the invention;

FIG. 19 is yet another example of the frame structure according to an embodiment of the invention;

FIG. 20 is yet another example of the frame structure according to an embodiment of the invention;

DETAILED DESCRIPTION OF THE PREFERRED EMBODIMENT

Figure 1:
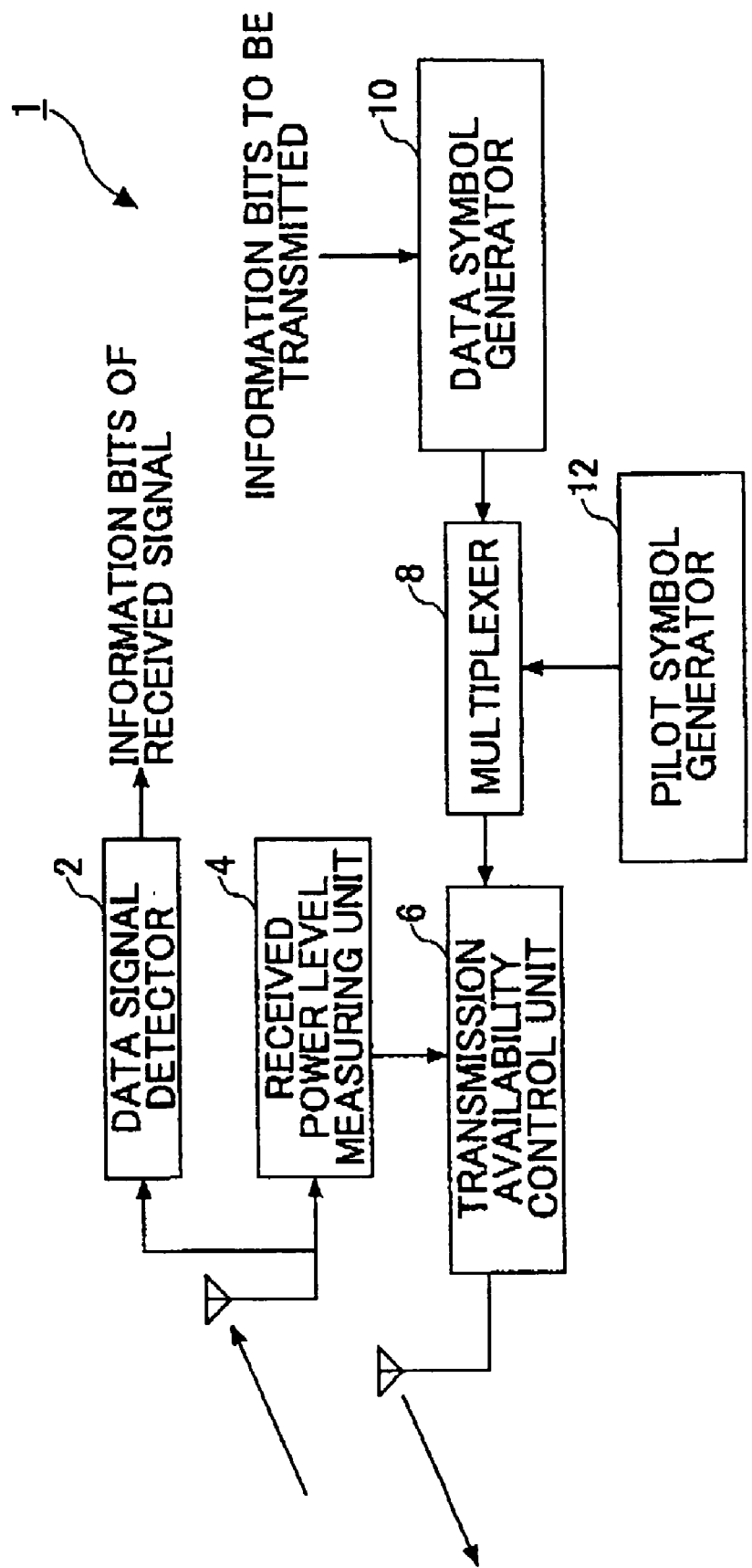
FIG. 1 is a schematic block diagram of a CSMA/CA transmitter/receiver.

The preferred embodiment of the present invention is described below in conjunction with the attached drawings.

In the drawings, same elements with a same function are denoted by the same symbols, and repetitive explanation for them is omitted.

Figure 2A:
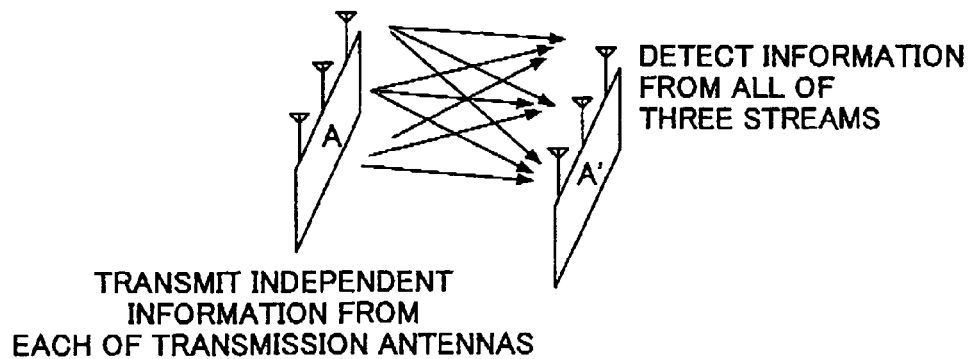
FIG. 2A illustrate an example of a communication system.

FIG. 2A illustrates a basic communication system. Mobile terminal A transmits an independent information item from each of multiple (three, for example) transmission antennas to mobile terminal A'. The mobile terminal A' receives all of the three information streams at each of the receiving antennas.

Figure 2B:
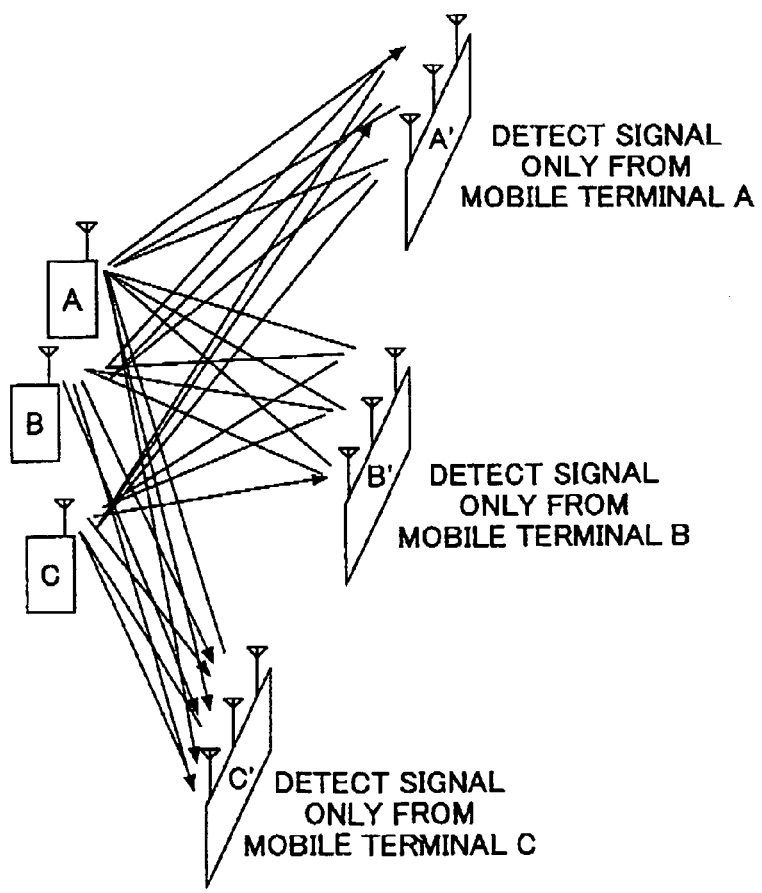
FIG. 2B illustrates a communication system according to the embodiment of the invention.

FIG. 2B illustrates a communication system suitable for the random access communication environment according to an embodiment of the invention. There are multiple mobile terminals A, B, and C on the transmission side, and there are also multiple mobile terminals A', B' and C' on the receiving side.

Signal sets transmitted from mobile terminals A, B and C, respectively, are received at the receiving antennas of each of the mobile terminals A', B' and C'. However, the mobile terminal A' detects only those signals transmitted from the counterpart mobile terminal A, the mobile terminal B' detects only those signals transmitted from the counterpart mobile terminal B, and the mobile terminal C' detects only those signals transmitted from the counterpart mobile terminal C.

This arrangement allows multiple mobile pairs A-A', B-B', and C-C' to perform radio communications simultaneously using the same frequency band.

FIG. 3 is a schematic block diagram illustrating a transmitter/receiver 100 according to the first embodiment of the invention, which is incorporated in each mobile terminal.

The transmitter/receiver 100 has a receiving antenna 101R, a data signal detector 102, a synchronization timing detector 106, and a frequency utilization status detector 108, which detectors are connected in parallel to the receiving antenna 101R. The transmitter/receiver 100 also has a symbol placement determination unit 112 connected to the frequency utilization status detector 108; a symbol placement unit 114 connected to the symbol placement determination unit 112; a transmission timing control unit 110 connected to the symbol placement unit 114; a pilot symbol generator 119; a data symbol generator 120; and a transmission antenna 101T connected to the transmission timing control unit 110.

The output signal from the synchronization timing detector 106 is supplied to the frequency utilization status detector 108 and the transmission timing control unit 110. The data signal detector 102 outputs information bits of a received data signal, while information bits to be transmitted are input to the data symbol generator 120.

The data signal detector 102 detects the data signal from the signal sets received at the receiving antenna 101R to output the information bits.

The synchronization timing detector 106 detects synchronization timings using, for example, a signal (such as a GPS signal) used in a different frequency band, or alternatively, the synchronization timings may be determined based on communication states of other mobile terminals using the same frequency band.

FIG. 4 is a schematic block diagram of the synchronization timing detector 106 employing the above arrangement to detect synchronization timing from the communication states of other mobile terminals. The synchronization timing detector 106 has a set of correlation acquiring units $402_1$-$402_N$, a set of timing determination units $404_1$-$404_N$, each connected to an associated one of the correlation acquiring units $402_1$-$402_N$, and a target synchronization timing adjusting unit 406 connected to the timing determination units $404_1$-$404_N$. Pilot signals 1 through N are input to the correlation acquiring units $402_1$-$402_N$, respectively. The pilot signals 1 through N are used by nearby mobile terminals and by the counterpart mobile terminal currently in communication with the focused-on mobile terminal with the transmitter/receiver 100.

Each of the correlation acquiring units $402_1$-$402_N$ determines correlation between the pilot signal used by one of the nearby mobile terminals and the received signal, and supplies the correlation result to the associated one of the timing determination units $404_1$-$404_N$. Each of the timing determination units $404_1$-$404_N$ determines synchronization timing based on the input correlation value, and supplies the determination result to the target synchronization timing adjusting unit 406. In this manner, transmission timings of nearby mobile terminals currently in communication can be detected.

Based on the transmission timings of the respective nearby mobile terminals, the target synchronization timing adjusting unit 406 determines target synchronization timing (for example, the average of the input transmission timings) as transmission timing, and supplies the determination result to the frequency stylization detector 108 and the transmission timing control unit 110.

When mobile terminal A is to start radio communications, the frequency utilization status detector 108 determines the utilization status of the frequency band to be used by the mobile terminal A.

Figure 5:
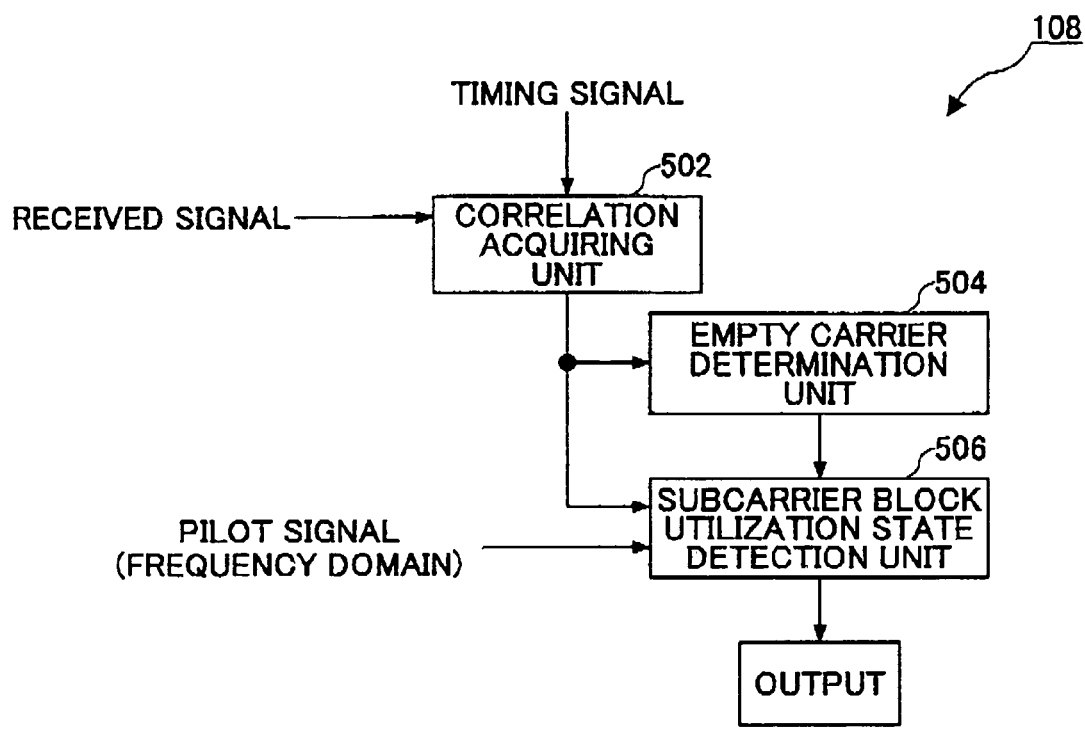
FIG. 5 is a schematic block diagram of the frequency utilization status detecting unit used in the transmitter/receiver shown in FIG. 3.

FIG. 5 is a schematic block diagram of the frequency utilization status detector 108. The frequency utilization status detector 108 has a correlation acquiring unit 502 to which the received signal and the timing signal output from the synchronization timing detector 106 are input. The output of the correlation acquiring unit 502 is supplied to empty carrier determination unit 504 and the subcarrier block utilization status detection unit 506. The output of the empty carrier determination unit 504 is also connected to the input of the subcarrier block utilization status detection unit 506.

The correlation acquiring unit 502 performs, for example, fast Fourier transform (FFT) using the synchronization (or transmission) timing signal detected by the synchronization timing detector 106 to detect the signal component of each subcarrier of the received signal, and supplies the correlation result to the empty carrier determination unit 504 and the subcarrier block utilization sate detection unit 506.

The empty carrier determination unit 504 selects those subcarriers with power levels below a prescribed threshold as empty subcarriers, among the signal components of the subcarriers in the received signal, and supplies information indicating the empty subcarriers to the subcarrier block utilization status detection unit 506.

The subcarrier block utilization status detection unit 506 detects the utilization status of the subcarriers based on the signal component of each of the subcarriers in the received signal and the information indicating the empty subcarriers, and supplies the detection result to the symbol placement determination unit 112.

In this embodiment, the number of empty carriers or the interval of the empty carriers corresponds to the degree of spatial multiplexing. Accordingly, the subcarrier block utilization status detection unit 506 can detects the degree of spatial multiplexing of each of the subcarrier blocks by detecting the number of empty subcarriers.

If it is necessary to detect the corresponding relationship between a certain mobile terminal and the subcarrier block used by that mobile terminal when, for example, that mobile terminal is conducting radio communications using two or more subcarriers or a whole subcarrier block, the subcarrier block utilization status detection unit 506 can detect the corresponding relationship by detecting the pattern of the pilot signal. However, in this case, it is presumed that different pilot signals with different pilot symbol patterns are used if the number of subcarrier blocks varies.

The detection of empty subcarriers at the frequency utilization status detector 108 may be performed on the transmission side (that is, at mobile terminal A), or alternatively, it may be carried out on the receiving side (at mobile terminal A') and fed back to the transmission-end mobile deice A. In the latter case, the feedback channel may be a control channel allocated in another frequency band, or may be multiplexed with the currently used frequency band.

Returning to FIG. 3, the symbol placement determination unit 112 determines the placement of pilot symbols and data symbols based on the subcarrier utilization status, and supplies the determination result to the symbol placement unit 114.

Figure 6:
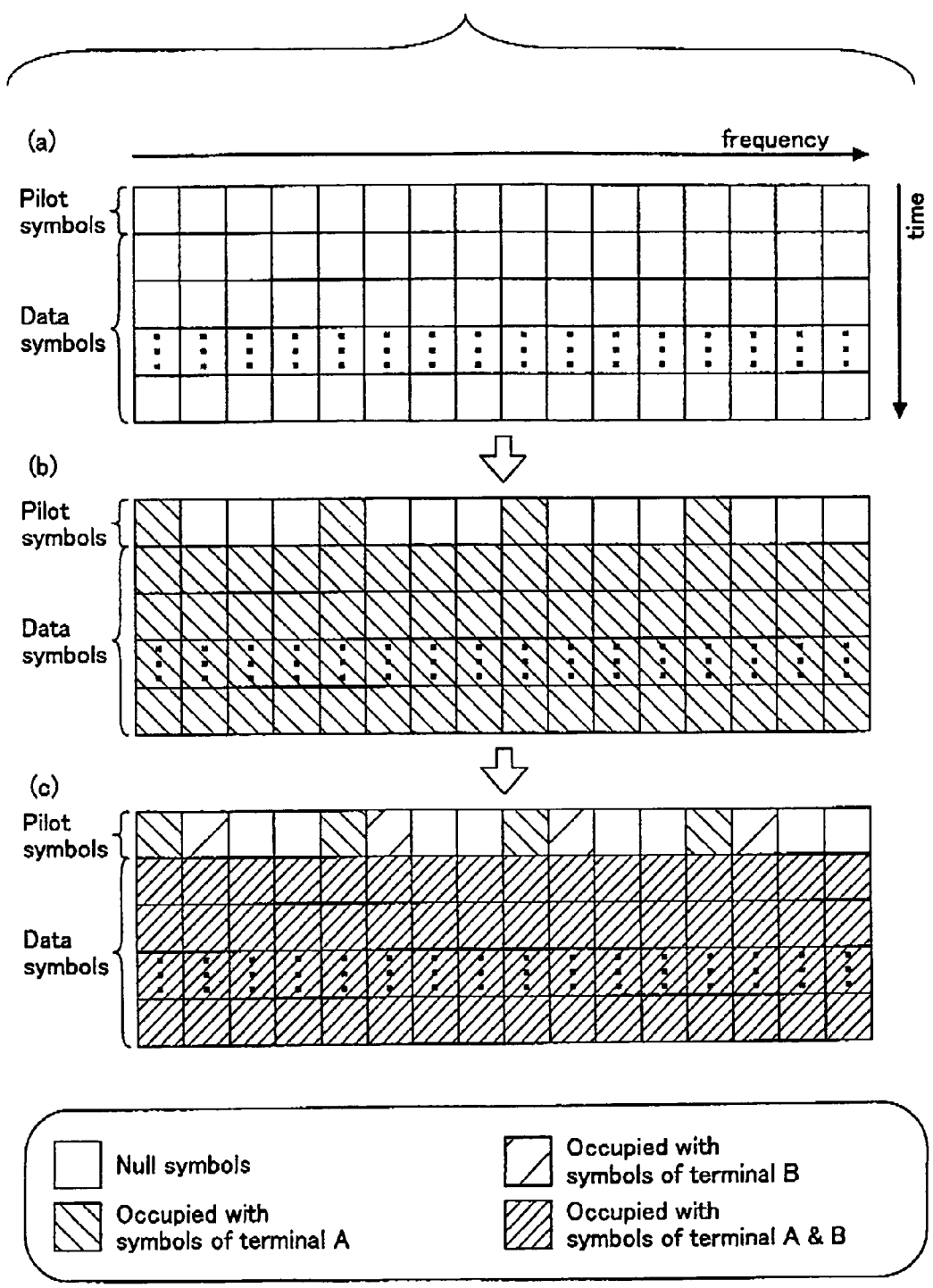
FIG. 6 illustrates a first example of the frame structure according to an embodiment of the invention.

FIG. 6 illustrates an example of frame structure used in the wireless communication system according to an embodiment of the invention. In this example, an OFDM scheme is employed and 16 subcarriers are used for radio communications. The maximum number of spatial multiplexinging is four (4). In FIG. 6, pilot symbols are placed before data symbols.

First, there is no user currently communicating in arrangement (a). In this situation, mobile terminal A is to start radio communications. The symbol placement determination unit 112 of mobile terminal A places pilot symbols at defined intervals of subcarriers, for example, every four (4) symbols, in the pilot symbol section so as to allow the user of mobile terminal A to start communications, as shown in arrangement (b). The remaining subcarriers (other that those with pilot symbols) are allocated null symbols.

This frame structure allows another user having started communications to be detected easily under the situation where the first user of mobile terminal A is already in communication, and can prevent channel estimation precision from being degraded. Consequently, delay in each packet is reduced and the communication capacity of the entire system can be improved.

The power level of each pilot signal may be a multiple of the subcarrier interval at which the pilot symbol is placed. In this example, the pilot signal power level is four times as high as that of data symbols.

When another mobile terminal B is to start communications, the frequency utilization status detector 108 of mobile terminal B detects that mobile terminal A and mobile terminal A' are already in radio communication. Accordingly, the symbol placement determination unit 112 of mobile terminal B determines to place pilot symbols every four symbols in the pilot symbol section so as not to overlap the pilot symbols allocated to the mobile terminal A, as illustrated in arrangement (c) in FIG. 6. The symbol placement determination unit 112 supplies the determined placement of pilot symbols and data symbols to the symbol placement unit 114 in order to allow mobile terminal B to start communication under the situation where mobile terminal A is already in communications with mobile terminal A'.

The data symbol generator 120 generates data symbols based on the supplied information bits to be transmitted, and supplies the generated data symbols to the symbol placement unit 114.

The pilot symbol generator 118 generates pilot symbols, and supplies the generated pilot symbols to the symbol placement unit 114.

The symbol placement-unit 114 actually places the data symbols and pilot symbols based on the data symbol placement and the pilot symbol placement determined by the symbol placement determination unit 112, and supplies the symbol sequence to the transmission timing control unit 110. If a control signal is to be multiplexed in the same frequency band, the symbol placement unit 114 places the control symbols in the symbol sequence and supplies the symbol sequence to the transmission timing control unit 110.

The transmission timing control unit 110 transmits the symbol sequence according to synchronization timing detected by the synchronization timing detector 106. As a result, multiple pairs of mobile terminals (A-A' and B-B') can perform radio communications synchronized with each other. In this case, the pilot symbols are orthogonalized between the simultaneously communicating mobile pairs.

Figure 7:
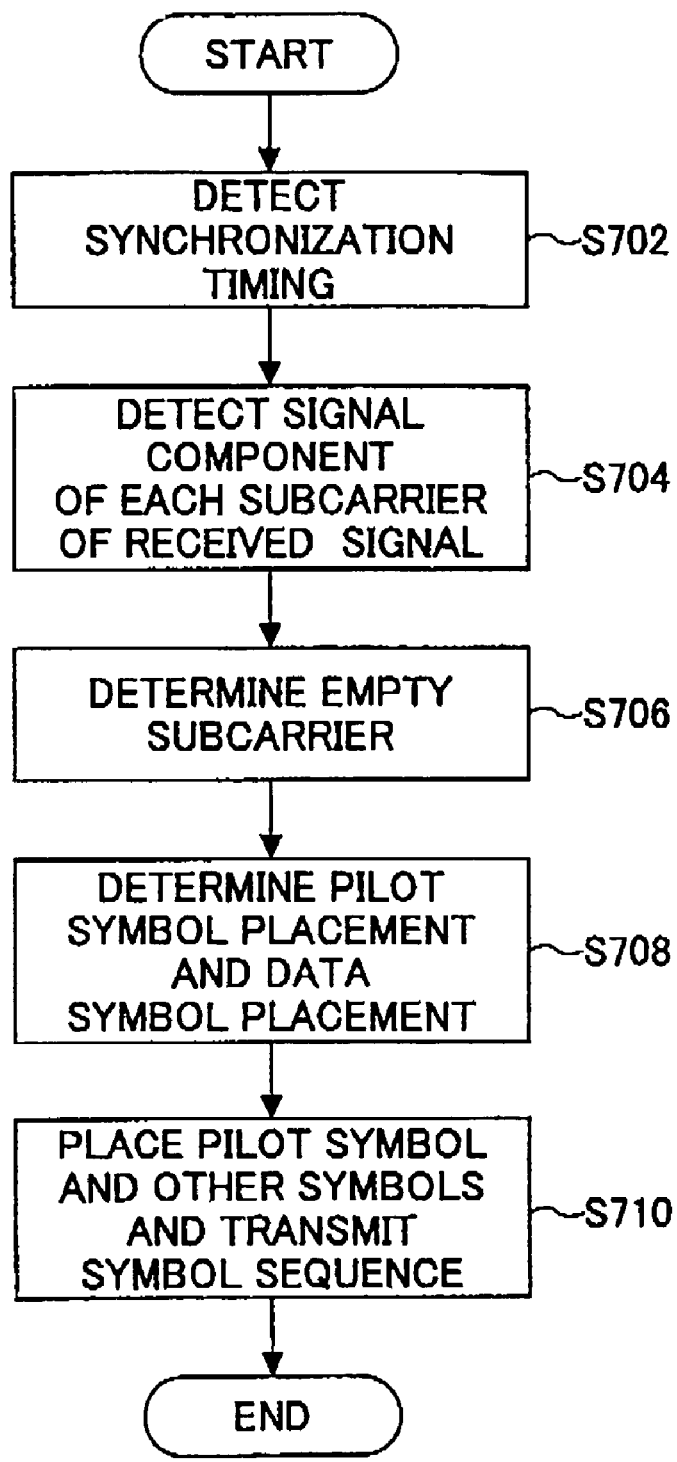
FIG. 7 is a flowchart showing the operations of the transmitter/receiver according to an embodiment of the invention.

FIG. 7 is a flowchart showing the operations carried out by the transmitter/receiver 100 according to an embodiment of the invention.

First, synchronization timing is detected by the synchronization timing detector 106 (Step S702). The signal component of each of the subcarriers contained in the received signal is detected by the frequency utilization status detector 108 according to the detected synchronization timing (step S704). Furthermore, empty subcarriers are determined by the frequency utilization detector 108 using the signal component of each subcarrier. (Step S706).

Then, pilot symbol placement and data symbol placement are determined by symbol placement determination unit 112 (step S708). Pilot symbols and other symbols are actually placed according to the determined symbol placement and a symbol sequence is transmitted (Step S710).

With this arrangement, radio communication is performed without causing excessive delay of each packet in the random access communication environment. The number of simultaneously accessing users can be increased up to four in this example, and consequently, the communication capacity of the entire system can be increased.

In order to allow five or more users to communicate simultaneous, the symbol placement determination unit 112 is configured so as to determine pilot symbol placement at subcarrier intervals corresponding to the number of simultaneously accessing users. To allow five users to have simultaneously access, the pilot symbol placement is determined so as to place pilot symbols every five subcarriers.

If packet collision occurs after radio communications are started simultaneously among multiple users, the transmission timing control unit 110 of a mobile terminal that is also to start communications is configured to control the transmission timing so as to start communications after a random time period.

At a receiver, multiple transmission signals from multiple mobile terminals are received, being superimposed on each other. However, this situation is exactly the one assumed in a MIMO or space division multiplex scheme, as illustrated in FIG. 2B. Accordingly, an arbitrary signal detection technique known in this field can be employed.

Next, the second embodiment of the invention is described. Since the hardware structure of the transmitter/receiver 100 is the same as that described in conjunction with FIG. 3 through FIG. 5 in the first embodiment, explanation for it is omitted.

In the first embodiment, the maximum number of spatial multiplexinging is defined in advance. In contrast, in the second embodiment, the pilot symbol interval is determined more flexibly.

FIG. 8 illustrates an example of frame structure according to the second embodiment. Prior to radio communications being started by mobile terminal A, there is no user currently in communication, as illustrated in the frame arrangement (a). Accordingly, the frequency utilization status detector 108 detects the pilot symbol section and the data symbol section consisting of null symbols. The symbol placement determination unit 112 of mobile terminal A determines symbol placement so as to allocate pilot symbols every other symbol in the pilot symbol section in order to allow mobile terminal A to start communications, as illustrated in arrangement (b) in FIG. 8.

After mobile terminal A has started communications, mobile terminal B is to start communications. In this case, mobile terminal A is already in communication with counterpart mobile terminal A'. Accordingly, the symbol placement determination unit 112 of mobile terminal B determines symbol placement so as to allocate pilot symbols every other symbol without interfering with the rest of the pilot symbols previously allocated to mobile terminal A, as illustrated in arrangement (c) in FIG. 8.

The simultaneous access from mobile terminal A and mobile terminal B results in no pilot symbols being available for other users. Accordingly, the symbol placement determination units 112 of the mobile terminals A and B change the pilot symbol placement to appropriate arrangements, for example, so as to place pilot symbols every three subcarriers as illustrated in arrangement (d) shown in FIG. 8.

The pilot symbol placement changing rule may be determined in advance so as to avoid collision of the pilot signal transmitted from mobile terminal A and the pilot signal transmitted from mobile terminal B. For instance, the changing rule may require placing pilot symbols at intervals determined by adding "1" to the number of simultaneously accessing users without changing the position of the leading pilot signal indicating the subcarrier of the lowest frequency. In addition, the pilot symbol placement changing timing may be select so as to change the symbol placement when N frames (where N is a known constant) are transmitted after mobile terminal B starts radio communications, or alternatively, it may be determined through communications between mobile terminal A and mobile terminal B using a control channel.

If the pilot symbol placement is changed after N frames from the beginning of the radio communications of mobile terminal 5, it is difficult for mobile terminal A to detect the start of communications of the mobile terminal B. Accordingly, it is desired for the mobile terminal A' to detect the radio communications started by mobile terminal B and feed the detection result back to mobile terminal A.

Figure 9:
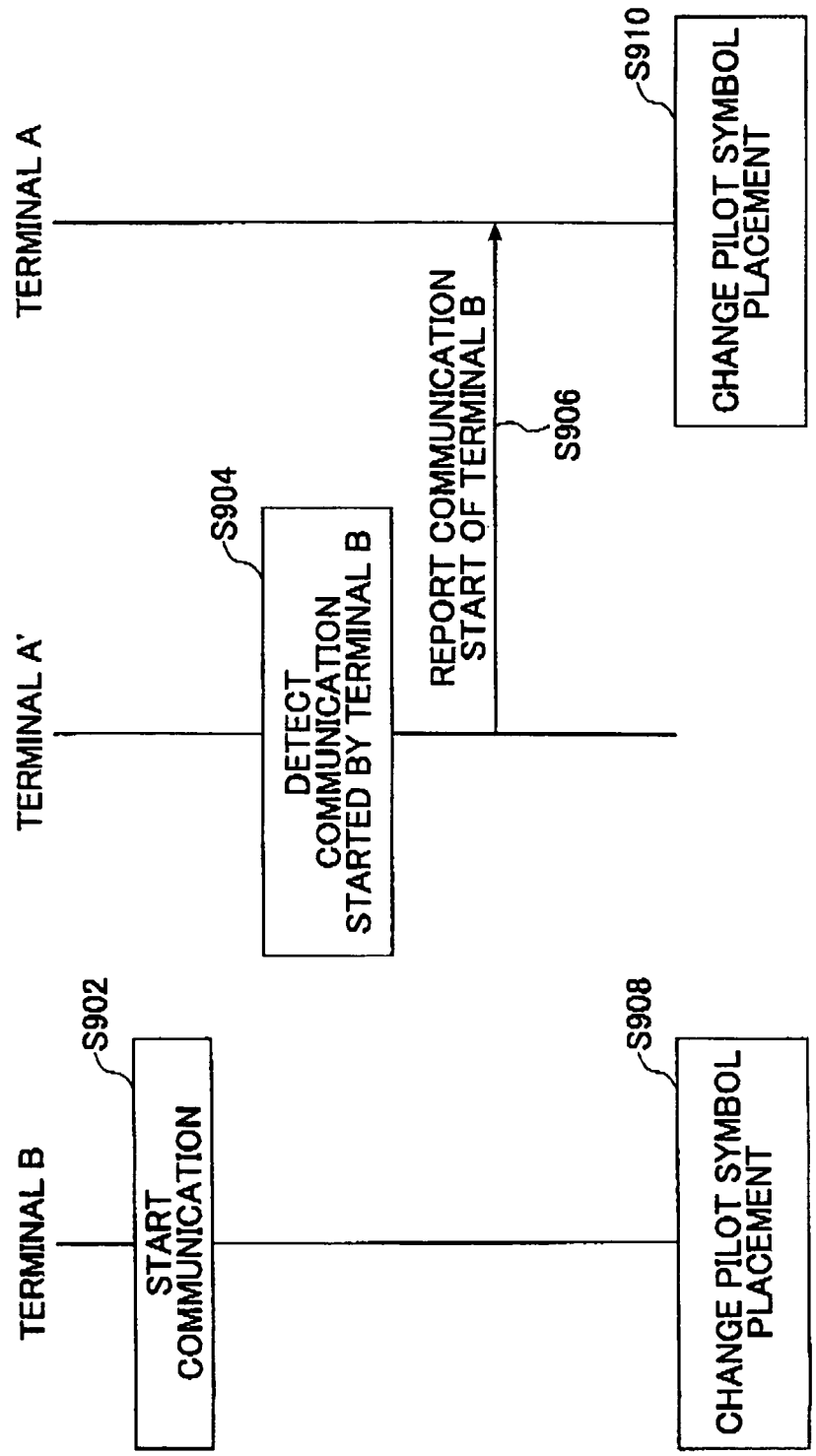
FIG. 9 is a sequence diagram showing the operations among multiple transmitters/receivers.

FIG. 9 is a sequence diagram of operations performed among mobile terminals A, A' and B. The mobile terminal A is currently communicating with mobile terminal A'. In this situation, mobile terminal B starts communication with mobile terminal B' (Step S902).

The signal transmitted from the mobile terminal B is also received at mobile terminal A'. Upon detecting the radio communications started by mobile terminal B (Step S904), the mobile terminal A' reports the new communications to the mobile terminal A (Step S906).

The symbol placement determination units 112 of mobile terminal A and mobile terminal B, respectively, change the placement of pilot symbols (steps S908 and S910).

It is preferable for the receiving-side mobile terminal to have as many antennas as the number of spatial multiplexing streams or more; however, it is not always true that a receiving side mobile terminal has a sufficient number of antennas. In such a case, the transmitter/receiver 100 transmits the same symbols repeatedly, or performs code spreading.

When one of the communication pairs A-A' and B-B' finishes communications, then the mobile terminals of other pair may change the placement of pilot symbols, as illustrated in FIG. 10. For example, during radio communications between the A-A' pair and the B-B' pair, the pilot symbols of each of the mobile terminal A and the mobile terminal B are placed every three subcarriers as illustrated in arrangement (a) of FIG. 10. When the communication pair B-B' finish communicating, the subcarriers having been occupied by mobile terminal B become empty, as illustrated in arrangement (b) in FIG. 10. Then, the symbol placement determination unit 112 of mobile terminal A may change the placement of pilot symbols to every other subcarrier, as illustrated in arrangement (c) in FIG. 10.

It is difficult for mobile terminal A to detect the termination of radio communications between mobile terminals B and B'. Accordingly, it is preferable to configure mobile terminal A' so as to detect information about the communication state of mobile terminal B that is accessing simultaneously with mobile terminal A using the same frequency band, together with ACK signals and information about MCS sets, and to feed the detected information back to mobile terminal A.

The same operation is performed when the radio communications between mobile terminal A and mobile terminal A' are finished. In this case, if the released subcarriers in the pilot signal section are located in the lower frequency band as compared with the currently used pilot channel, the placement of pilot symbols is determined so as to shift each of the pilot symbols from the currently placed position to the lower frequency side by at least one subcarrier.

Next, the third embodiment of the invention is described. The structure of the transmitter/receiver 100 of the third embodiment is the same as that shown in FIGS. 3-5, and explanation for it is omitted.

In the second embodiment, the intervals of subcarriers allocated to pilot symbols can be set to an appropriate value in a flexible manner. In this case, subcarriers in which no pilot symbols are placed are determined by complementing the channel estimates acquired from the subcarriers already allocated to pilot symbols. Depending on the situation, it may be desired that the pilot symbol allocation interval of subcarriers be set to 2 to the power of n. (See, for example, "DFT-based Channel Estimation in 2D-Pilot-Symbol-Aided OFDM Wireless Systems", M. Julia Fernandez-Getino Gracia, et al., Proc. of IEEE VTC 2001, pp. 810-814, 2001.) Accordingly, in the third embodiment, the interval of subcarriers allocated to pilot symbols is set to 2 to the power n.

To be more precise, the symbol placement determination unit 112 selects the minimum value that exceeds the number of current spatial multiplexing streams plus 1 and that satisfies $2^n$ (where n is a natural number) when determining the pilot symbol allocation interval of subcarriers.

FIG. 11 illustrates an example of frame structure indicating pilot symbol placement. When mobile terminal A starts communications with mobile terminal A' using an unoccupied frequency band (arrangement (a) in FIG. 11), pilot symbols are placed every other subcarrier ($2^1$, which is greater than 0+1), as illustrated in arrangement (b) in FIG. 11. When mobile terminal B start communications with mobile terminal B' using the unoccupied subcarriers, as illustrated in arrangement (c) in FIG. 11, the pilot symbol arrangement of every other subcarrier for mobile terminal B does not satisfy the condition $2^1 > 1+1$ any longer. Accordingly, the symbol placement determination units 112 of mobile terminal A and mobile terminal B, respectively, change the placement of pilot symbols by selecting 4, which is the minimum number of $2^n$ exceeding the number of current spatial multiplexing streams plus 1 (2+1), as illustrated in arrangement (d) in FIG. 11. Consequently, each of mobile terminal A and mobile terminal B places pilot symbols every four subcarriers.

Next, the fourth embodiment of the invention is explained. In the first embodiment, the subcarrier interval for pilot symbol placement is set to a fixed value. In the second embodiment, the subcarrier interval can take a variable value so as to be appropriately selected in a flexible manner. In the third embodiment, the subcarrier interval is set to $2^n$. The fourth embodiment is described below using an example of variable subcarrier interval; however, it is applicable to the structure employing a fixed subcarrier interval or employing a suitable value satisfying 2n and greater than the number of current spatial multiplexing streams plus one.

A receiving-side mobile terminal does not always have multiple receiving antennas. In addition, even if code spreading is performed, the number of information symbols contained in a frame decreases if a large spreading factor is used. As a result, the pilot symbol ratio increases relatively, and the transmission efficiency is degraded. Depending on the communication type, it is preferable to use a narrower frequency band for a longer time. This applies to, for example, voice communication.

Accordingly, in the fourth embodiment, the transmitter/receiver is configured to allocate a certain range of the frequency band when the interference level exceeds a prescribed level or depending on the communication type required by a mobile terminal, instead of a fixed allocation of the entire frequency band.

Figure 12:
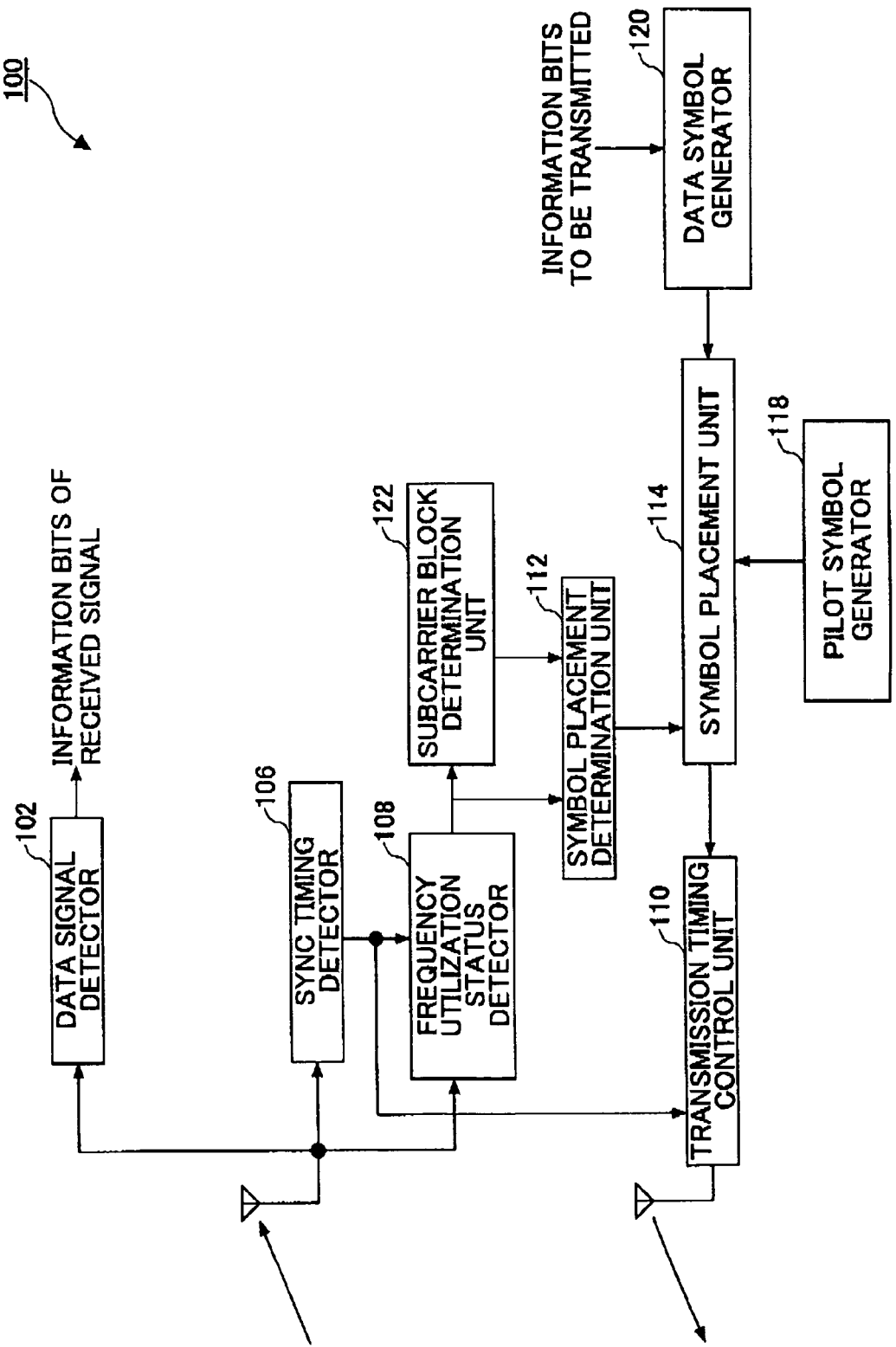
FIG. 12 is a schematic block diagram of a modification of the transmitter/receiver according to an embodiment of the invention.

FIG. 12 is a block diagram of the transmitter/receiver 100 according to the fourth embodiment of the invention. The transmitter/receiver 100 has a subcarrier block determination unit 122 connected to the frequency utilization status detector 108 and the symbol placement determination unit 112, in addition to the structure shown in FIG. 3.

Figure 13:
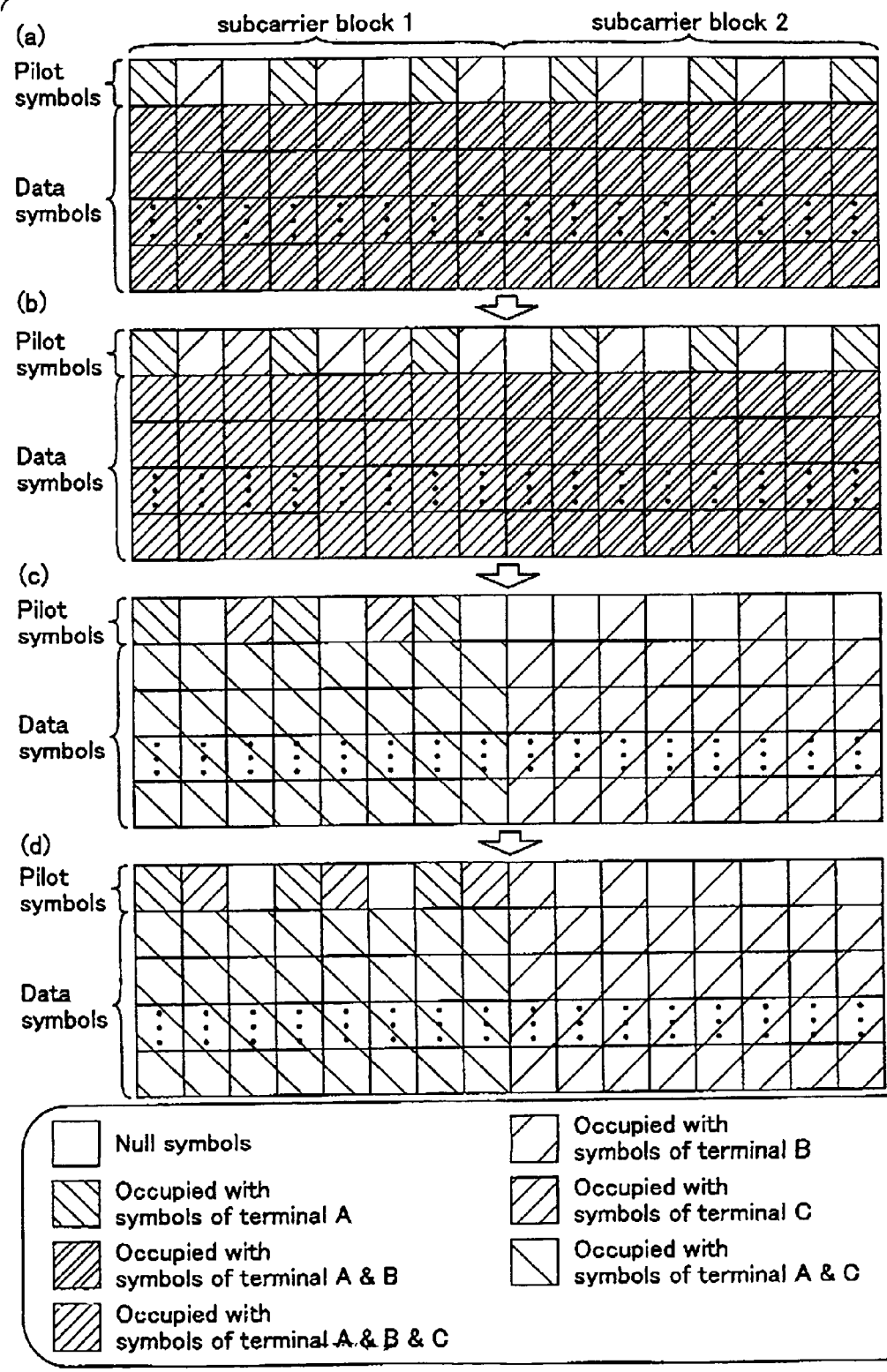
FIG. 13 is yet another example of the frame structure according to an embodiment of the invention.

The operation of the subcarrier block determination unit 122 is explained in conjunction with FIG. 13.

Two mobile terminals A and B are currently communicating with the counterpart mobile terminals A' and B', respectively, using the same frequency band as illustrated in arrangement (a) in FIG. 13. In this situation, another mobile terminal C starts communicating using the frequency band already occupied by mobile terminals A and B. It is assumed that mobile terminal C is designed so as to be operative under spatial multiplexing of two users or less, The subcarrier block determination unit 122 of mobile terminal C divides the entire frequency band into several subcarrier groups or blocks (two blocks in this example), and determines to use the first half (block 1) of the frequency band to start communications. The determination result is supplied to the symbol placement determination unit 112. The symbol placement determination unit 112 determines placement of pilot symbols and data symbols in the selected subcarrier block 1.

Since in this example the subcarrier block determination unit 122 of mobile terminal C selects the subcarrier block 1 (from among subcarrier blocks 1 and 2) to place pilot symbols, the pilot symbol occupation of the subcarrier blocks 1 and 2 become one illustrated in arrangement (b) in FIG. 13.

The frequency utilization status detectors 108 of the already communicating mobile terminals A and B detect the newly started radio communications by monitoring the pilot channel. The size of the subcarrier block (or the number of subcarriers in the subcarrier block) is not necessarily half of the total subcarriers; however, it is desired to define subcarrier blocks available for each of the mobile terminals in advance. For example, a table defining available subcarrier blocks may be provided in each of the mobile terminals, and the subcarrier block determination unit 122 determines a subcarrier block by referring to the table.

A rule that "if the number of spatial multiplexing streams will vary among the lower-level subcarrier blocks under a certain subcarrier block to be used in a hierarchical structure by participation of a new mobile terminal in a hierarchical block structure, then the size (i.e., the number of occupied subcarriers) of the subcarrier block to be used is reduced" may be established in advance. (The details of this rule are described below in conjunction with the ninth embodiment). According to this rule, upon detecting new radio communications started by mobile terminal C, the symbol placement determination units 112 of the mobile terminals A and B reduce the number of the subcarriers occupied in the subcarrier blocks 1 and 2. For example, the number of pilot symbols allocated to mobile terminal B is reduced in subcarrier block 1, while pilot symbols allocated to mobile terminal A are reduced in subcarrier block 2, as illustrated in arrangement (c) in FIG. 13.

In this case, it may be ruled in advance that "a mobile terminal that is using a subcarrier whose frequency is higher than the subcarrier position of the leading pilot symbol is to use a subcarrier block of the higher frequency side" so as to prevent both mobile terminals A and B from occupying the same subcarrier block 1.

The subcarrier block determination unit 122 of mobile terminal B detects that the pilot symbol for this mobile terminal B is using a subcarrier higher than the leading pilot symbol position. Accordingly, mobile terminal B determines to use subcarrier block 2 and changes the pilot symbol placement so as to place pilot symbols only in subcarrier block 2, without using subcarrier block 1, by a method described in the previous embodiments. The mobile terminal A does the same thing. In the example shown in FIG. 13, pilot symbols of mobile terminal A and pilot symbols of mobile terminal C are placed every three subcarriers in subcarrier block 1, and pilot symbols of mobile terminal B are finally placed every other subcarriers in subcarrier block 2, as illustrated in arrangement (d) in FIG. 13.

Next, explanation is made of operations performed when one of the mobile terminals currently communicating using the subcarrier blocks in the frequency band finishes communications in conjunction with FIGS. 14, 15 and 16.

Using subcarrier blocks 1 and 2, each consisting of 8 subcarriers, pilot symbols of mobile terminal A are placed every three subcarriers throughout the subcarrier blocks 1 and 2, pilot symbols of mobile terminal B are placed every three subcarriers in subcarrier block 2, and pilot symbols of mobile terminal C are placed every three subcarriers in subcarrier block 1, as illustrated in arrangement (a) in FIG. 14.

In this situation, when mobile terminal A finishes communications, each of the subcarrier blocks is occupied by only a single user with pilot symbols placed every three subcarriers, as illustrated in arrangement (b) in FIG. 14. Then, the symbol placement determination units 112 of mobile terminal B and mobile terminal C change the symbol placement and rearrange pilot symbols every other subcarrier in the associated subcarrier blocks so as to allow a new mobile terminal to start communications, as illustrated in arrangement (c) in FIG. 14.

FIG. 15 is another example of frame structure, in which mobile terminal C finishes communicating among currently communicating mobile terminals A, B, and C, as illustrated in arrangement (a) in FIG. 15.

When the mobile terminal finishes communicating, the subcarrier block 1 is occupied by mobile terminal A, while the subcarrier block 2 is shared by mobile terminals A and B, as illustrated in arrangement (b) in FIG. 15.

In this case, the subcarrier block determination unit 122 of mobile terminal A determines to use only subcarrier block 1 exclusively used by this mobile terminal A. On the other hand, the subcarrier block determination unit 122 of mobile terminal B determines to continuously use the currently occupied subcarrier block 2. As a result, pilot symbol arrangement becomes the arrangement (c) shown in FIG. 15. The symbol placement determination units 112 of mobile terminals A and B further change symbol placement so as to place pilot symbols every other subcarrier in the associated subcarrier blocks 1 and 2, as illustrated in arrangement (d) in FIG. 15.

FIG. 16 is still another example in which an adjacent subcarrier block is completely empty. For example, subcarrier block 1 is occupied by mobile terminal A, and subcarrier block 2 is occupied by mobile terminal B, as illustrated in arrangement (a) in FIG. 16. When subcarrier block 2 is completely opened, as illustrated in arrangement (b) in FIG. 16, then the symbol placement determination unit 112 of mobile terminal 112 rearranges pilot symbol placement so as to use the adjacent subcarrier block 2.

Since in this embodiment the frequency band is divided into subcarrier blocks, the transmission timing control unit 110 is configured to take synchronization with adjacent subcarrier blocks.

Next, the fifth embodiment of the invention is described. The structure of the transmitter/receiver 100 of the fifth embodiment is the same as described in the fourth embodiment in conjunction with FIG. 12, and therefore, explanation for it is omitted.

Under the situation where radio communication is performed using divided subcarrier blocks in the allocated frequency band, the degree of spatial multiplexing may become imbalanced or asymmetric among subcarrier blocks when one or more of the currently communicating mobile terminals finish communication. Accordingly in the sixth embodiment the transmitter is configured to correct the imbalance in degree of spatial multiplexing between subcarrier blocks.

To be more precise, a mobile terminal being in communication monitors the pilot section of the adjacent subcarrier blocks, in addition to the subcarrier block being used. The subcarrier block utilization status detection unit 506 (FIG. 5) of the frequency utilization status detector 508 detects the number of spatial multiplexing streams of the adjacent subcarrier blocks, and supplies the detection result to the subcarrier block determination unit 122 and the symbol placement determination unit 112.

The subcarrier block determination unit 122 compares the number of space division multiples of the adjacent subcarrier blocks with that of the subcarrier block being used. If the number of spatial multiplexing streams of an adjacent subcarrier block is less than that of the currently using subcarrier block with a difference of 2 or more, then it is determined to change the currently using subcarrier block to the less occupied adjacent subcarrier block. If two or more users (mobile terminals) change the subcarrier block simultaneously, signal collision may occur depending on which user changes the subcarrier block.

To avoid this problem, it may be ruled that "a user who is using a pilot symbol corresponding to an empty subcarrier of the lowest frequency in the pilot symbol section of the adjacent subcarrier block is to change the currently using subcarrier block." Alternatively, a user allowed to shift to the adjacent subcarrier block may be determined in advance using a broadcast channel.

FIG. 17 is an example of frame structure according to the fifth embodiment. In subcarrier block 1 consisting of 8 subcarriers, pilot symbols of each of the mobile terminals A, B and C are placed every three subcarriers, while in subcarrier block 2, pilot symbols of mobile terminal D are placed every other subcarrier, as illustrated in arrangement (a) in FIG. 17.

The frequency utilization status detector 108 of mobile terminal B monitors the adjacent subcarrier block 2, in addition to the currently used subcarrier block 1, to determine the number of spatial multiplexing streams of these subcarrier blocks 1 and 2, and supplies the detection result to the subcarrier block determination unit 122.

The subcarrier block determination unit 122 compares the number of spatial multiplexing streams of the currently used subcarrier block 1 with that of the adjacent subcarrier block 2. If it is determined that the number of spatial multiplexing streams of the adjacent subcarrier block 2 is less than that of the currently used subcarrier block 1 with difference of 2 or more, the subcarrier block determination unit 122 changes the subcarrier block to the less busy subcarrier block 2.

In this example, the number of spatial multiplexing streams of the adjacent subcarrier block 2 is one (1), which is less than three (3) that is the number of spatial multiplexing streams of the currently used subcarrier block 1 with the difference of two, and therefore, the subcarrier block determination unit 122 of mobile terminal B determines to shift to subcarrier block 2 from subcarrier block 1. As a result, subcarrier block 1 is occupied by pilot symbols of mobile terminals A and C, and subcarrier block 2 is occupied by pilot symbols of mobile terminals B and D, as illustrated arrangement (b) in FIG. 17.

Then, the symbol placement determination units 112 of mobile terminals B and D in subcarrier block 2 change the number of spatial multiplexing streams so as to allow a new user to use the subcarrier block 2. Consequently, pilot symbols of mobile terminals A and C are placed every three subcarriers in subcarrier block 1, and pilot symbols of mobile terminals B and D are placed every three subcarriers in subcarrier block 2, as illustrated in arrangement (c) in FIG. 17.

Next, the sixth embodiment of the invention is described in conjunction with FIG. 18 and FIG. 19.

The structure of the transmitter/receiver 10 of the sixth embodiment is the same as that shown in FIG. 12, and therefore, explanation for it is omitted.

In the subcarrier block determination explained in conjunction with FIG. 13, in which a part of the allocated frequency band can be used according to a space division multiplexing scheme, the communication capacity of the overall system may be restricted beyond necessity.

Accordingly, in the sixth embodiment, space division multiplexing is allowed as long as the number of spatial multiplexing streams of each subcarrier block does not exceed a prescribed level, regardless of the current utilization status of the subcarrier block (that is, regardless of whether a certain mobile terminal uses subcarriers across the entire frequency band, or whether each of multiple mobile terminals is using one of the subcarrier blocks).

In the example described below, the interval of pilot symbol placement is fixed to a prescribed value; however, the subcarrier interval for symbol placement may be variable or set to $2^n$. The acceptable (threshold) level of the spatial multiplexing streams is 2, and the pilot symbol placement interval is three so as to allow a new mobile terminal to start communication.

In FIG. 18, pilot symbols of mobile terminal A and pilot symbols of mobile terminal B are placed every three subcarriers throughout subcarrier blocks 1 and 2, each consisting of 8 subcarriers, as illustrated in arrangement (a) in FIG. 18. If mobile terminal C starts communicating and places pilot symbols in subcarrier block 1, the number of spatial multiplexing streams in subcarrier block 1 becomes 3, which exceeds the prescribed threshold value "2", as illustrated in arrangement (b) in FIG. 18. Accordingly, one of the mobile terminals using this subcarrier block 1 has to stop using the subcarrier block 1.

The mobile terminal to stop using the subcarrier block 1 may be determined at random from among the mobile terminals using this subcarrier block 1; however, it is more preferable to define a rule for designating a mobile terminal that is to quit using the overcrowded subcarrier block depending on the situation. This arrangement can avoid congested subcarrier utilization over the acceptable number of spatial multiplexing streams.

As to the rule, if the number of subcarrier blocks used by the proceeding mobile terminals A and B is the same, then the one using a higher frequency at the leading pilot symbol is to stop using the overcrowded subcarrier block 1, as illustrated in arrangement (c) in FIG. 18.

If a new mobile terminal C starts communicating in subcarrier block 1 in the situation illustrated in arrangement (a) in FIG. 19, and if subcarrier block 1 becomes overcrowded exceeding the acceptable number of space division multiples as illustrated in arrangement (b) in FIG. 19, then, it may be ruled that the mobile terminal A using more subcarrier blocks stops using the overcrowded subcarrier block 1, as illustrated in arrangement (c) in FIG. 19.

If each of the currently communicating mobile terminals uses one of the subcarrier blocks, and if the acceptable number of spatial multiplexing streams is 2 in each of the subcarrier blocks, then it may be configured so as to allow a new mobile terminal to start communicating even if the number of spatial multiplexing streams of a certain subcarrier block becomes 3 as a result of communications start of the new mobile terminal.

This arrangement applies to the case where the acceptable number of spatial multiplexing streams is three or more.

Next, the seventh embodiment is described in conjunction with FIG. 20. Because the structure of the transmitter/receiver 10 is the same as that illustrated in FIG. 12, explanation for it is omitted.

If mobile terminals having different numbers of receiving antennas share the same frequency band (for example, a mobile terminal receives signals using a single receiving antenna, while another mobile terminal receives signals using two receiving antennas), the transmission rate of the mobile terminal with fewer receiving antenna becomes extremely low due to lack of ability to detect desired signals from the spatially multiplexed signal.

Accordingly, in the seventh embodiment, a mobile terminal is configured so as to be allowed to carry out pilot symbol placement using subcarriers for two or more mobile terminals. It is assumed that the acceptable number of spatial multiplexing streams is 2, and that the pilot symbol placement interval of a mobile terminal is set to 3. In this case, the number of spatial multiplexing streams can be reduced so as not to exceed the acceptable number of spatial multiplexing streams by allowing a certain mobile terminal to use subcarriers for two or more mobile terminals in placing pilot symbols.

However, another problem of degradation of the system efficiency as a whole or of dissatisfaction of delay requests of other users may arise due to the occupation of the frequency band by a certain mobile terminal with fewer receiving antennas.

To overcome this problem, the number of pilot symbols allowable for symbol placement of that mobile terminal is restricted according to the number (or the size) of the currently used subcarrier blocks. For example, the maximum allowable pilot symbols may be determined according to Table 1.

TABLE 1

| # of blocks currently used | Maximum allowable # of pilot symbols |
| --- | --- |
| 1 | $N*N_d$ |
| 2 | $(N-1)*N_d$ |
| . | . |
| . | . |
| . | . |
| N or more | $N_d$ |

In the table, symbol $N_d$ denotes the number of default pilot symbols per mobile terminal.

FIG. 20 illustrates an example of transmission of frame stylization state when mobile terminal B uses a subcarrier block exclusively.

The number of subcarrier blocks currently used is 2 (N=2 in Table 1) as illustrated in arrangement (a) in FIG. 20, and each of the users is allowed to use subcarriers for two mobile terminals when placing pilot symbols if the user is allowed to exclusively use a certain subcarrier block. In this case, when mobile terminal B starts communicating, the subcarrier block determination unit 122 of mobile terminal B determines to use subcarrier block 1, and the symbol placement determination unit 112 determines to place pilot symbols using subcarriers for two mobile terminals, as illustrated in arrangement (b) in FIG. 20. As a result, the number of spatial multiplexing streams of subcarrier block 1 becomes 2, and therefore, mobile terminal A determines to stop using subcarrier block 1, as illustrated in arrangement (c) in FIG. 20.

Figure 21:
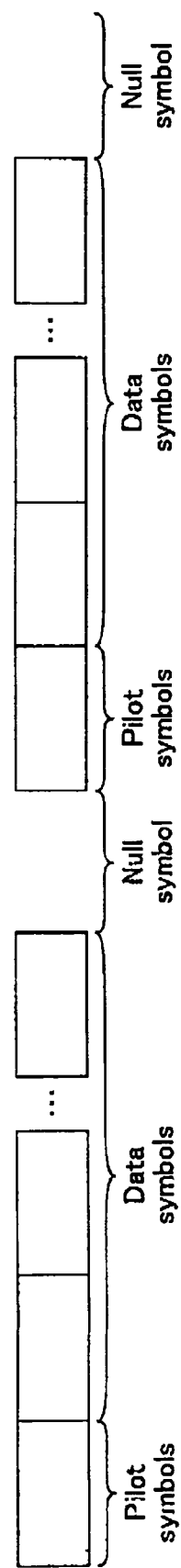
FIG. 21 is yet another example of the frame structure according to an embodiment of the invention.

Next, the eighth embodiment of the invention is described in conjunction with FIG. 21. Since the structure of the transmitter/receiver is the same as that illustrated in conjunction with FIGS. 3-5 and FIG. 12, explanation for it is omitted.

In actually starting communications, a broadcast channel and a control channel for transmitting an MCS set or an ACK signal are required. The control channel may be in a different frequency band, or alternatively, multiplexed with the frequency band used for pilot symbol/data transmission.

When multiplexing the control channel, the control signal may be transmitted using at least a portion of the frame used for data signals. In the embodiments, a mobile terminal can start communicating during radio communications of another mobile terminal, and a broadcast channel or other channels may be spatially multiplexed with the data signal of other mobile terminals. In such cases, each mobile terminal has to always receive spatially multiplexed signals, which causes the power consumption of the mobile terminal to increase. Concerning ACK signals, it is impossible to receive ACK signals in the same frequency band during signal transmission.

To take the above-described circumstances into account, in the eighth embodiment, a next frame is transmitted with a prescribed interval after the transmission of the previous frame, as illustrated in FIG. 21. For example, the transmission timing control unit 110 controls the transmission timing so as to transmit a next pilot symbol with at least one null symbol inserted after the transmission of the previous pilot symbols and data symbols.

Using the unused symbol section, the receiving-side mobile terminal that is currently in communication can transmit an ACK signal and the channel utilization status to the transmission-side mobile terminal. The ACK signal transmitted using a null symbol section is not necessarily the ACK for the frame transmitted immediately before that null symbol section. Those mobile terminals that are not in communication with other mobile terminals may transmit control information including the mobile ID numbers using the null symbol section.

It should be noted that, to confirm the availability of the null symbol section (or to confirm the fact that the null symbol section is not used by other users), the channel has to be monitored for a time period longer than the null symbol section.

Next, the ninth embodiment of the invention is described in conjunction with FIG. 22 through FIG. 25. Because the structure of the transmitter/receiver 10 is the same as that described in conjunction with FIG. 12, explanation for it is omitted.

In the ninth embodiment, the subcarrier blocks form a predetermined hierarchical structure, and an appropriate subcarrier block is selected according to the hierarchical structure when communicating using the subcarrier blocks.

Figure 22:
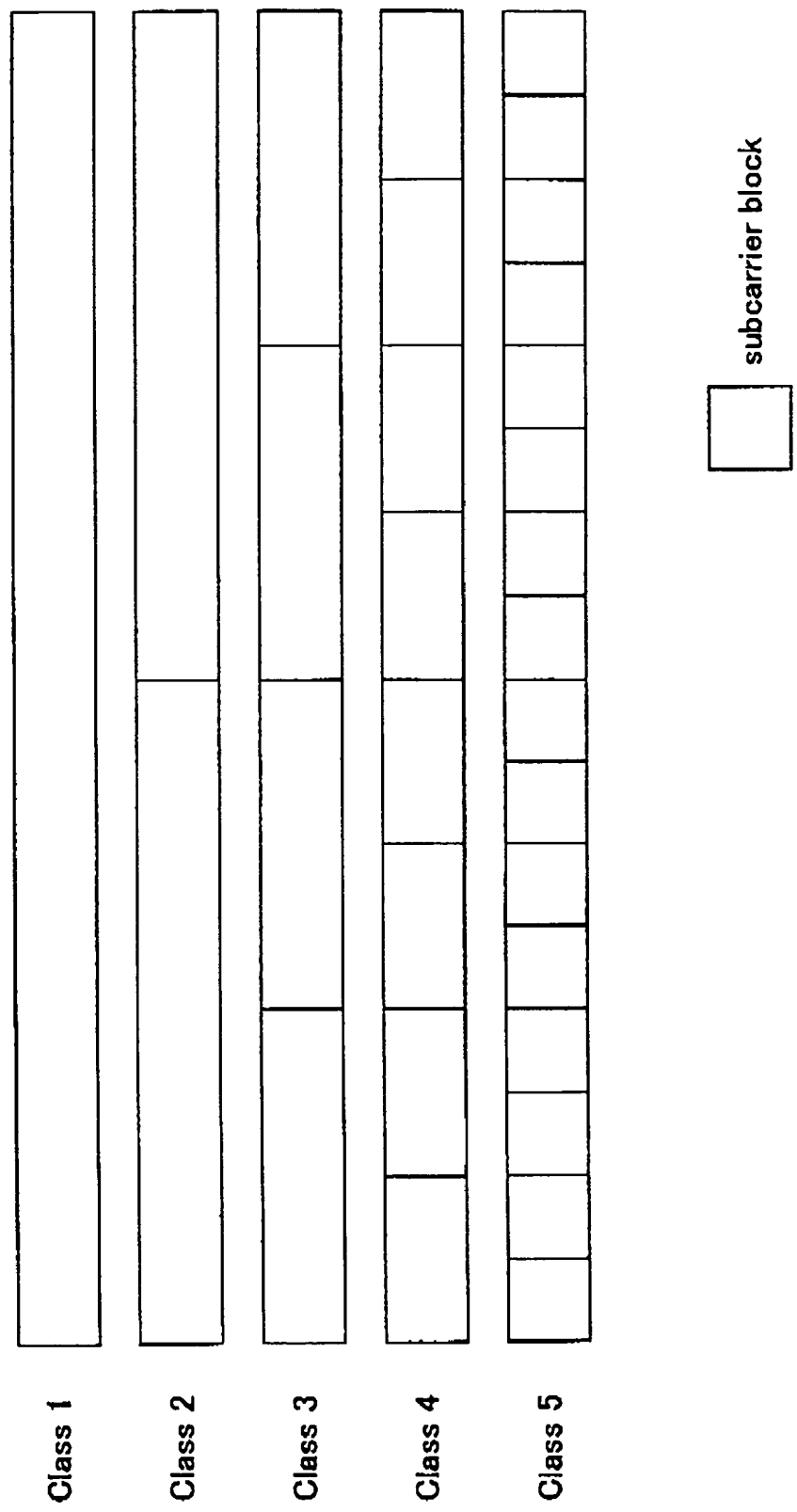
FIG. 22 is yet another example of the frame structure according to an embodiment of the invention.

FIG. 22 illustrates an example of the hierarchical structure, which example has a 5-level subcarrier block structure including class 1 through class 5. The numbers of subcarriers blocks in class 1, 2, 3, 4 and 5 are 1, 2, 4, 8 and 16, respectively. Lower-level subcarrier blocks are determined by dividing each of the subcarrier blocks belonging to the level or the class immediately above.

Figure 23:
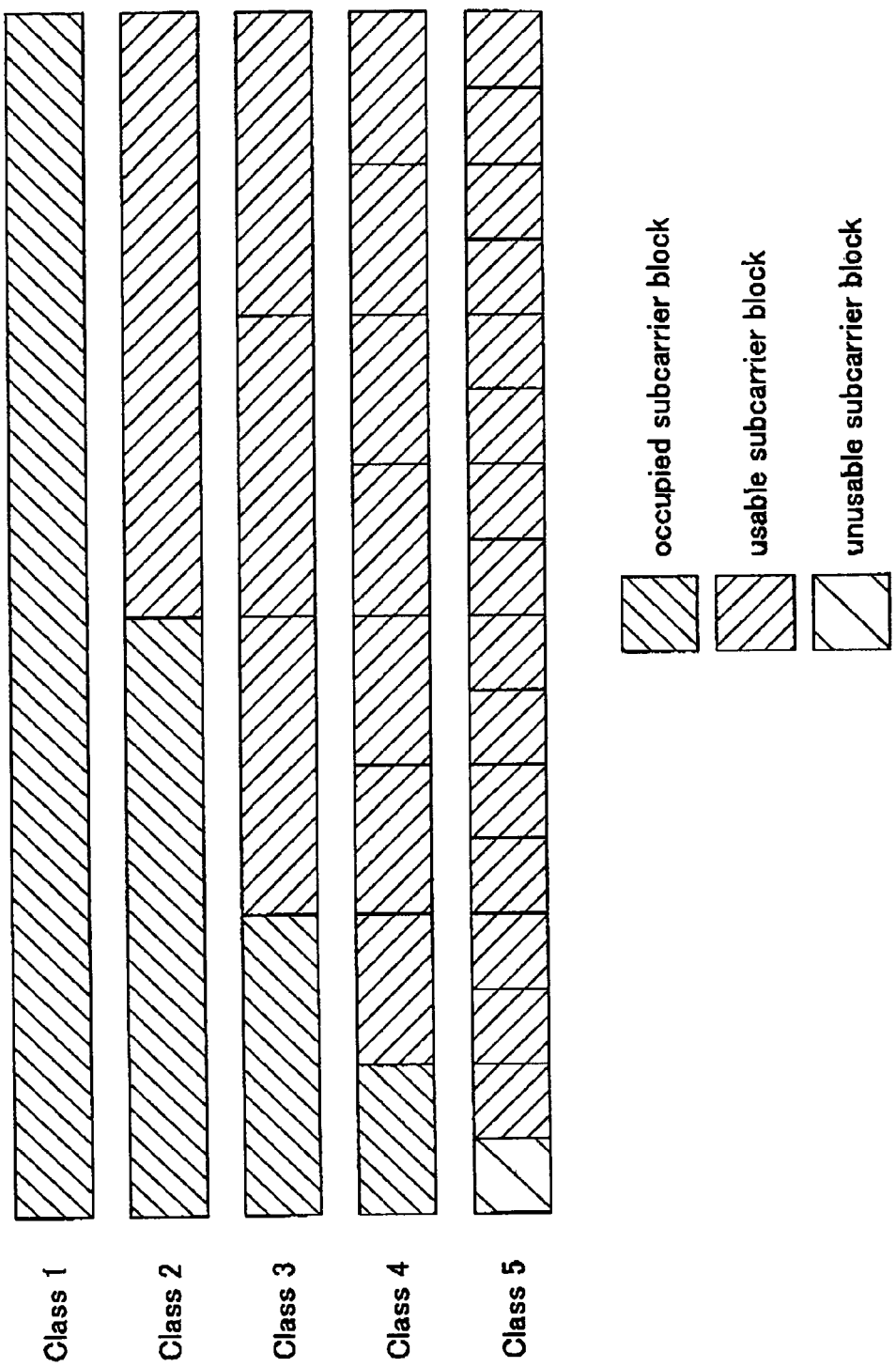
FIG. 23 is yet another example of the frame structure according to an embodiment of the invention.
Figure 24:
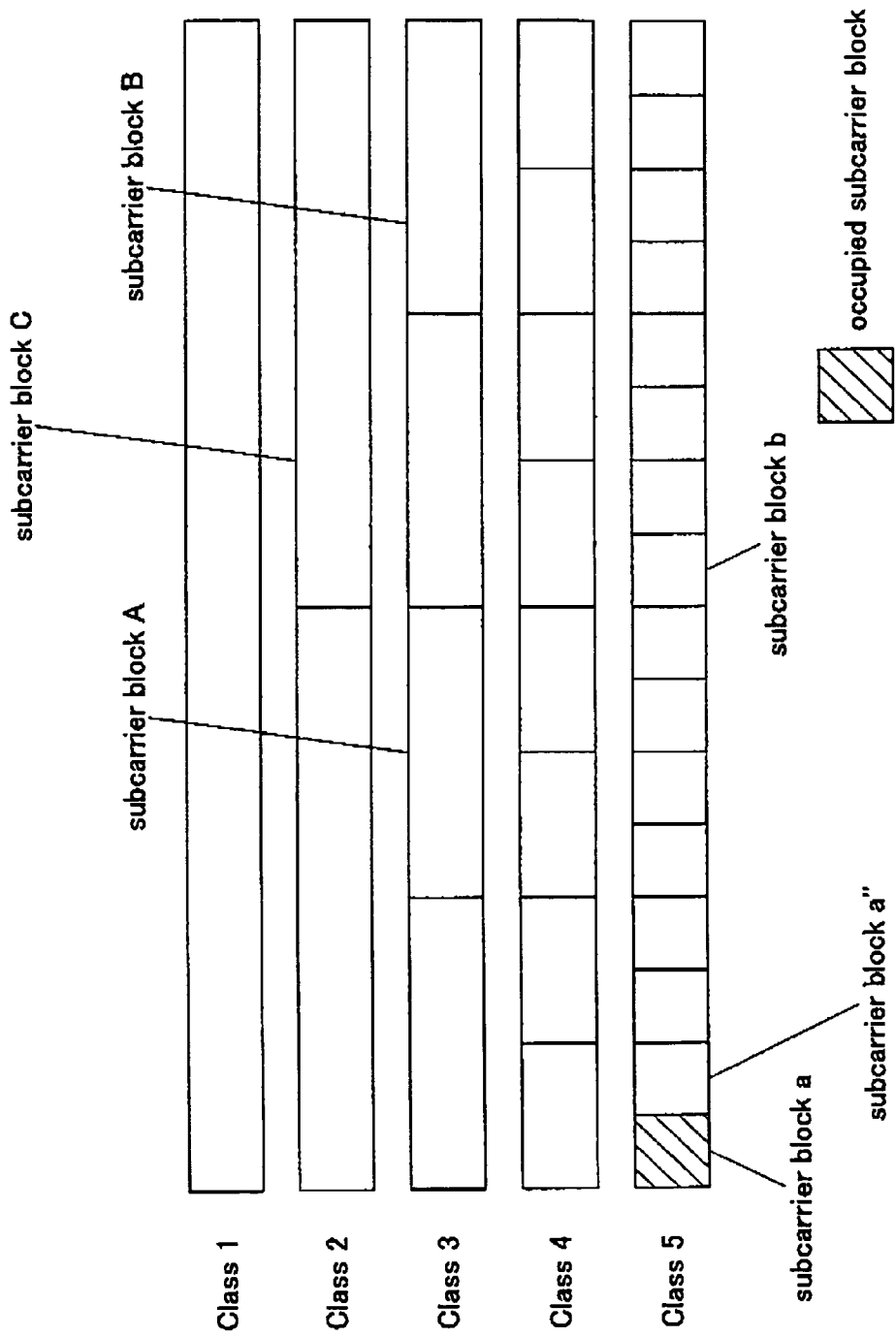
FIG. 24 is yet another example of the frame structure according to an embodiment of the invention.

The rule that "if the numbers of space division multiples of lower-level subcarrier blocks under a certain subcarrier block to be used will differ from each other, then the size (or the number of subcarriers currently occupied by symbols) of the subcarrier block to be used is reduced" may be applied. In this case, if subcarrier block "a" of class 5 is used as illustrated in FIG. 24, and if the first subcarrier block is occupied in upper classes as illustrated in FIG. 23, then an subcarrier block available for a new mobile terminal is one that does not include the subcarrier block "a". Namely, subcarrier blocks 2-16 are available in class 5, subcarrier blocks 2-7 are available in class 4, subcarrier blocks 2-4 are available in class 3, and subcarrier block 2 is available in class 2.

The subcarrier block determination unit 112 may determine to use a part or all of the available subcarrier blocks, or alternatively, it may determine not to use some of the available subcarrier blocks.

In FIG. 24, if another mobile terminal B is to start communicating using class 5 under the situation where subcarrier block "a" is already occupied by mobile terminal A, there are 15 options for mobile terminal B to use any one of subcarrier blocks 2-16. If the system is designed to allow a mobile terminal to use only one subcarrier block at a time, and if mobile terminal B selects subcarrier block "b" in class 5, then the highest class available for still another mobile terminal C that is trying to start radio communications using as broad a range as possible is class 3. To avoid this situation, it is desired for each of the mobile terminals to select a subcarrier block such that "the maximum size of the unused subcarrier block becomes the maximum" when starting communications. According to this rule, the mobile terminal will select subcarrier block "a'"", instead of subcarrier-block "b", as illustrated in FIG. 24.

Figure 25A:
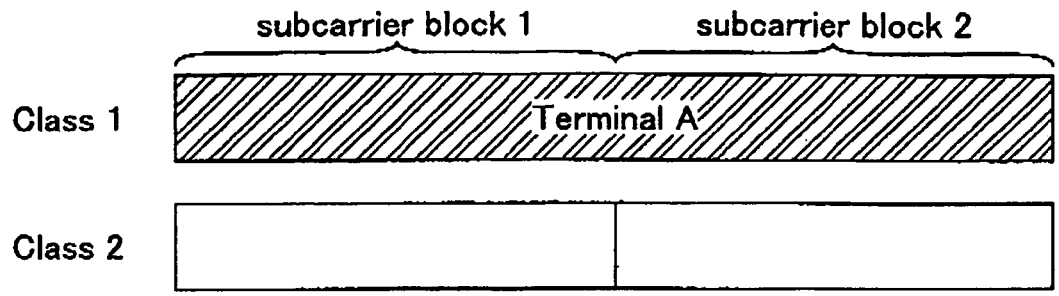
FIG. 25A is yet another example of the frame structure according to an embodiment of the invention.
Figure 25B:
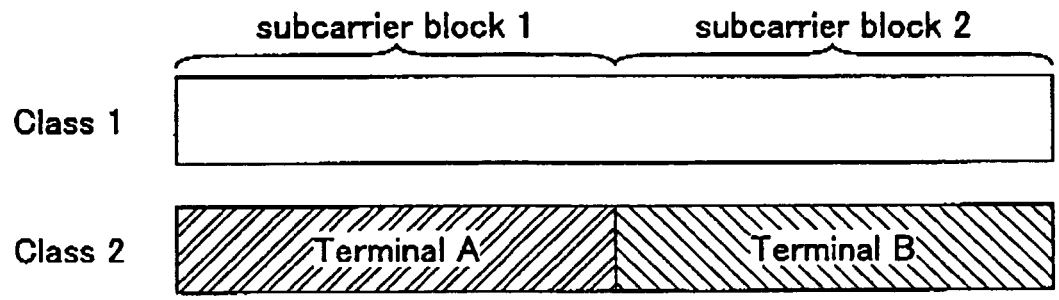
FIG. 25B is yet another example of the frame structure according to an embodiment of the invention.

On the other hand, if the system is designed to allow a mobile terminal to use two or more subcarrier blocks, and if all of the subcarriers in the allocated frequency band are used, then the occupation status of the subcarrier blocks may be as illustrated in FIG. 25A or FIG. 25B.

If it is necessary for a new mobile terminal to "reduce the size of the sub carrier block to be used when the number of spatial multiplexing streams will vary among the lower-level subcarrier blocks under that subcarrier block to be used", and if the frame occupation state is the one illustrated in FIG. 25B, then it is undesirable for the new mobile terminal to start communicating using the entire frequency band.

Accordingly, it becomes necessary to detect the current status of subcarrier block occupation state. To realize this, the symbol placement determination unit 112 of mobile terminal A uses two different pilot symbol patterns used for subcarrier block 1 and subcarrier block 2, respectively.

Figure 26:
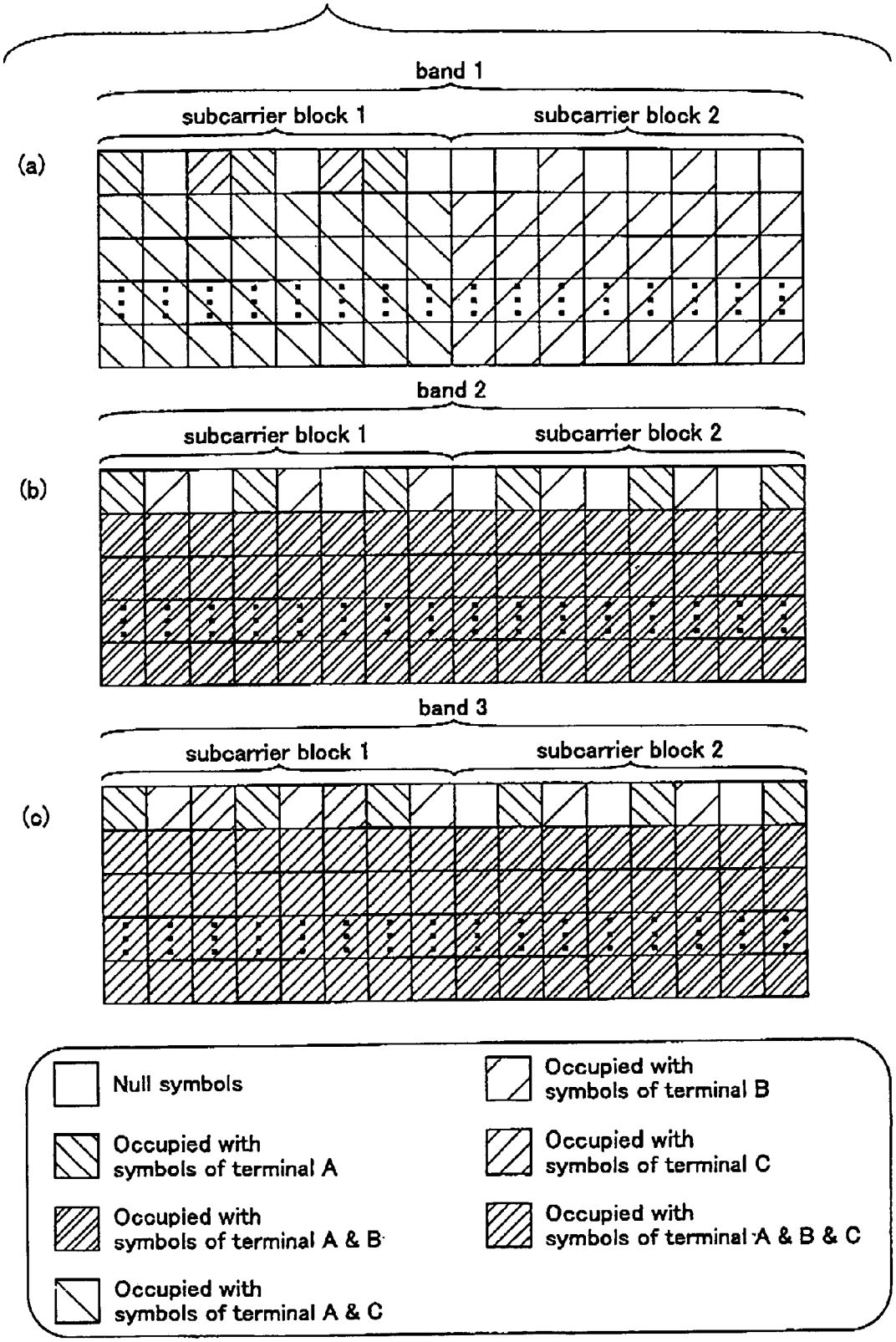
FIG. 26 is yet another example of the frame structure according to an embodiment of the invention.

Next, the tenth embodiment of the invention is described in conjunction with FIG. 26. Because the structure of the transmitter/receiver 10 is the same as that illustrated in FIG. 12, explanation for it is omitted.

In the tenth embodiment, multiple frequency bands, band 1, band 2, and band 3 exist as illustrated in arrangements (a) through (c) in FIG. 2. In this case, the system is designed such that the above-described communication techniques are performed independently in each of the frequency bands. In addition, the system may be designed to allow a mobile terminal to use two or more frequency bands. In this case, the subcarrier block determination unit 122 determines a subcarrier block independently for each of the frequency bands.

In the example shown in FIG. 26, the subcarrier block determination unit 122 of mobile terminal A determines to use subcarrier block 1 in frequency band 1, subcarrier blocks 1 and 2 in frequency band 2, and subcarrier blocks 1 and 2 in frequency band 3. In mobile terminal B, the subcarrier block determination unit 122 determines to use subcarrier block 2 in frequency band 1, subcarrier blocks 1 and 2 in frequency band 2, and subcarrier blocks 1 and 2 in frequency band 3. In mobile terminal C, the subcarrier block determination unit 122 determines to use subcarrier block 1 of frequency band 1 and subcarrier block 1 of frequency band 3.

Figure 27:
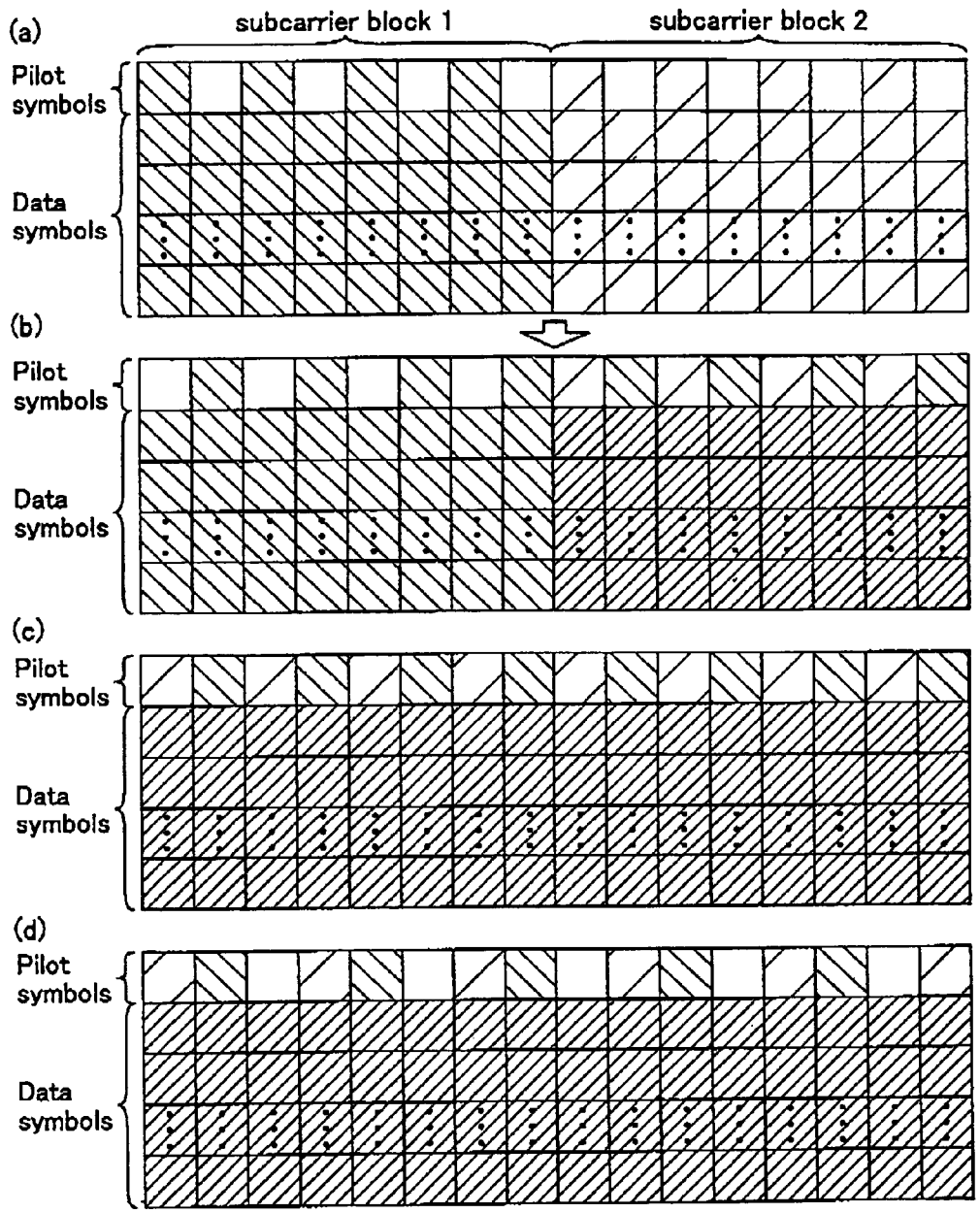
FIG. 27 is yet another example of the frame structure according to an embodiment of the invention.

Next, the eleventh embodiment of the invention is described in conjunction with FIG. 27. Because the structure of the transmitter/receiver 10 is the same as that shown in FIG. 12, explanation for it is omitted.

If the current number of spatial multiplexing streams is the same between adjacent subcarrier blocks, a mobile terminal using one of these adjacent subcarrier blocks can double the frequency range by using the adjacent subcarrier blocks although the SNR achieved in each of the adjacent subcarrier blocks is reduced. Which subcarrier block occupation state is advantageous to achieve higher throughput depends on the channel gain or other factors between mobile terminals.

Accordingly, in the eleventh embodiment, the subcarrier block determination unit 122 of mobile terminal A calculates the throughput acquired when using each of the subcarrier blocks independently to determine whether using the entire frequency band is advantageous. If it is determined that using the entire frequency band is advantageous, the subcarrier block determination unit 122 determines to use subcarrier blocks 1 and 2, and supplies the determination result to symbol placement determination unit 112.

To be more precise, mobile terminal A is currently using subcarrier block 1 consisting of 8 subcarriers with pilot symbols placed every other subcarrier, and mobile terminal B is using subcarrier block 2 with pilot symbols placed every other subcarrier, as illustrated in arrangement (a) in FIG. 27.

The frequency utilization detector 108 estimates channel estimation values, noise levels, interference levels, noise power levels of the mobile terminal A itself and the mobile terminal B currently using the adjacent subcarrier block 2, and inputs the estimates to the subcarrier block determination unit 122.

Based on the input information, the subcarrier block determination unit 122 of mobile terminal A calculates a throughput obtained when sharing the adjacent subcarrier block with the mobile terminal B, and compares the calculated throughput with the current throughput achieved under exclusive use of subcarrier block 1 to determine whether using the entire frequency band is more advantageous. If it is determined that using the entire frequency band is more advantageous, the subcarrier block determination unit 122 places pilot symbols in empty subcarriers in subcarrier block 2, as illustrated in arrangement (b) in FIG. 27.

Similarly, if mobile terminal B determines that it is more advantageous to share the entire frequency band with mobile terminal A, pilot symbols are placed in the empty subcarriers in subcarrier block 1 by mobile terminal B, as illustrated in arrangement (c) in FIG. 27.

In this case, all the empty subcarriers would be allocated. Accordingly, the symbol placement determination units 112 of mobile terminals A and B determine to place their pilot symbols every three subcarriers throughout subcarrier blocks 1 and 2, respectively, as illustrated in arrangement (d) in FIG. 27.

If mobile terminal B determines that it is better not to share the entire frequency band with mobile terminal A, it continues to perform radio communications for a prescribed time period, while maintaining the current frame structure. In this case, the mobile terminal A changes the frame structure according to the rule that "if the number of spatial multiplexing streams will vary among the lower-level subcarrier blocks under the subcarrier block to be used, then the size (the number of occupied subcarriers) of the subcarrier block to be use is reduced". In this case, the mobile terminal A changes the frame structure so as not to use subcarriers of subcarrier block 2, returning to the original arrangement of placing pilot symbols every other subcarrier in subcarrier block 1.

At this time, it is necessary for mobile terminal B to determine whether a mobile terminal that is to use subcarrier block 2 has already been using other subcarrier blocks. This can be realized by letting a new mobile terminal that is to start radio communications use a pilot symbol sequence different from that of a mobile terminal already in communication using other subcarrier blocks.

When mobile terminals A and B carry out the above-described operations, pilot signals may collide with each other. To avoid this, for example, mobile terminal A changes the pilot symbol placement from the arrangement (b) in FIG. 27, in which pilot symbols of mobile terminal A are placed every other subcarrier throughout subcarrier blocks 1 and 2, back to arrangement (a) in which pilot symbols of mobile terminal A are placed every other subcarrier only in the subcarrier block 1 being exclusively used.

In the above-described embodiments, signals may be detected from multiple communication groups.

Figure 28:
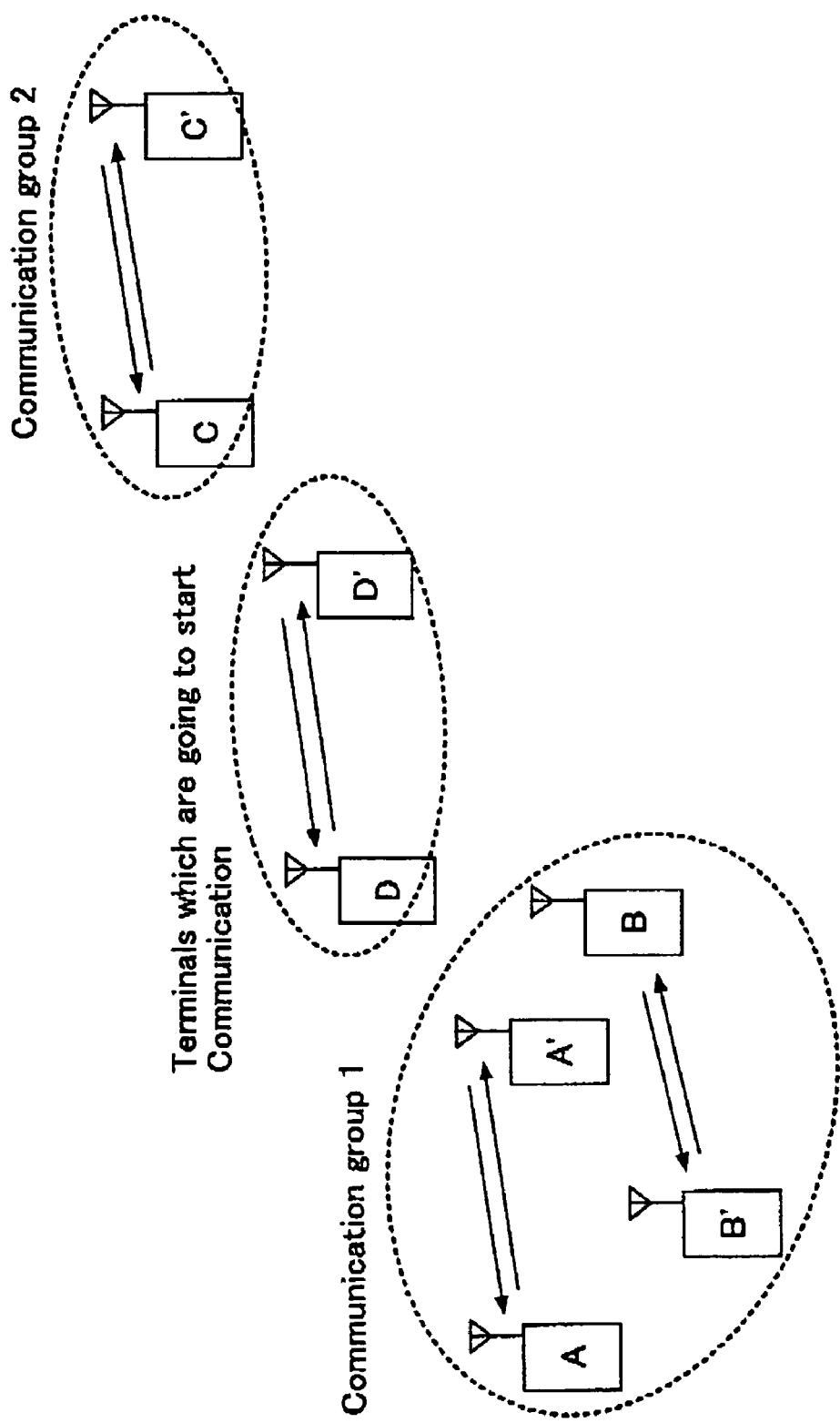
FIG. 28 is a schematic diagram illustrating an example of service provided by a communication system according to an embodiment of the invention.

In FIG. 28, communication group 1 and communication group 2 are conducting radio communications at different places. In communication group 1, mobile terminals A and A', and mobile terminals B and B' are in communication synchronized with each other with pilot signals orthogonalized in a frequency domain. In communication group 2, mobile terminal C and mobile terminal C' are in communication. The communication group 2 is located away from communication group 1, and therefore, the power level of signals received at communication group 2 from communication group 1 is sufficiently small.

In this situation, mobile terminal D and mobile terminal D' located between the communications groups 1 and 2 start communicating. Mobile terminals D and D' receive signals from mobile terminals belonging to the communication groups 1 and 2. The synchronization timing detectors 106 of the mobile terminal D and mobile terminal D' calculate the power level of the signals received from communication groups 1 and 2, and adjust the synchronization timing so as to be synchronized with the communication group from which a signal with higher power level is received. This arrangement also applies to the case in which three or more communication groups are detected.

The synchronization timing detector 106 may be configured to output a synchronization signal in sync with a signal transmitted from a transmitter belonging to the group with the fewest users when receiving signals from multiple other communication groups.

Figure 29:
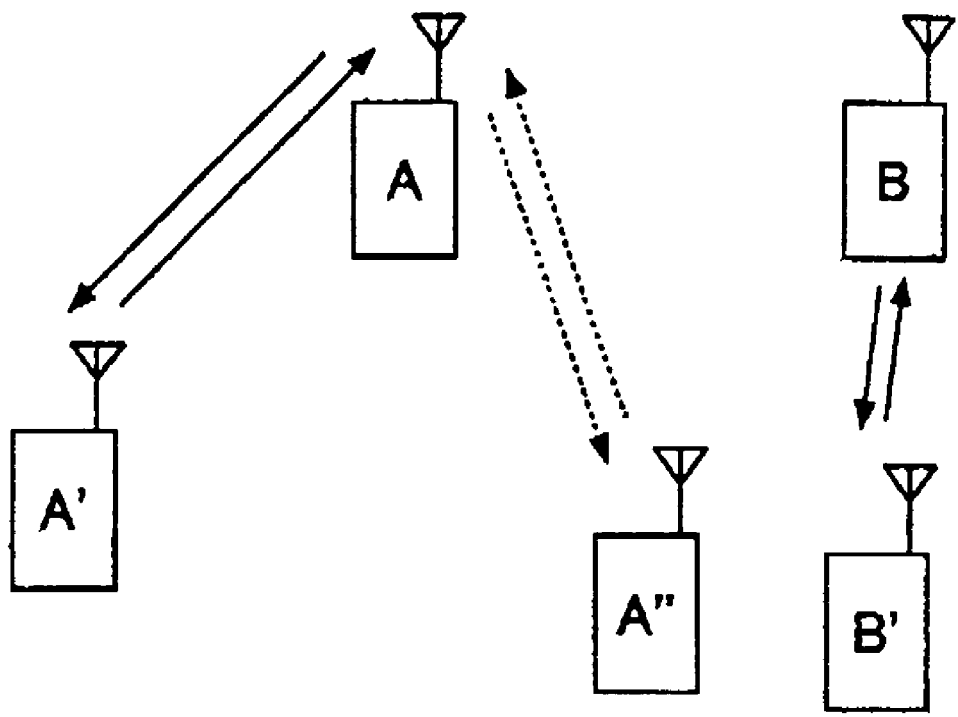
FIG. 29 is a schematic diagram illustrating another example of service provided by a communication system according to an embodiment of the invention.

FIG. 29 is a schematic diagram illustrating another example of communication service in which multiple mobile terminals share a certain frequency band.

Mobile terminal A and mobile terminal A' are in communication with each other. Mobile terminal B and mobile terminal B' are in communication with each other. When a new mobile terminal A" is to start communicating with mobile terminal A, the mobile terminal A" starts communicating according to the methods described in the above embodiments behaving as if the mobile terminal A is a newly participating mobile terminal.

When multiple mobile terminals share a frequency band in the above-described embodiments, a mobile terminal does not necessarily carry out radio communications using only a single stream. A transmitter may have multiple transmission antennas, and in this case, independent information streams from these transmission antennas are spatially multiplexed. The above-described methods also apply to this case and the same signal processing is performed by treating each of the transmission antennas as an independent transmitter.

Figure 30:
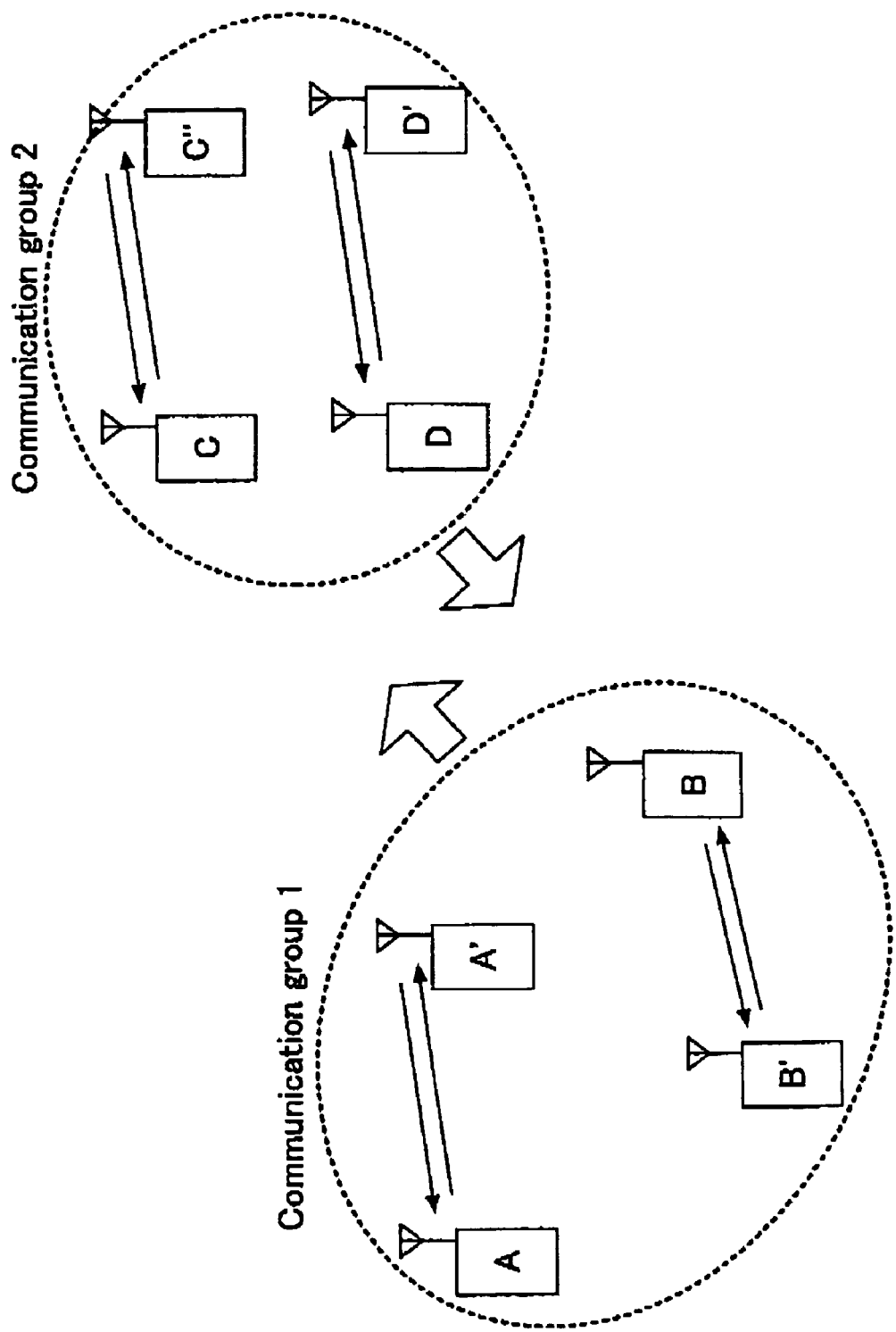
FIG. 30 is a schematic diagram illustrating still another example of service provided by a communication system according to an embodiment of the invention.

FIG. 30 is a schematic diagram of still another communication service. In FIG. 30, two independent communication groups 1 and 2 are approaching each other, and the signal power level from the other communication group is increasing.

Under this situation, if increase of interference power level is detected, or if errors are detected continuously in a frame, then communication is suspended, and started again according to the methods described in the previous embodiments after a random time period passes. Increase of interference power level from the other communication group can be estimated from the average power level of the pilot symbol section after subtraction of the unused symbol section or the replica of the received signal.

For example, frequency utilization status detector 108 measures interference power levels, and supplies the measurement result to the symbol placement determination unit 112. If the supplied interference power level exceeds a prescribed threshold level over a prescribed number of frames (over successive N frames), then the symbol placement determination unit 112 suspends the symbol placement operation temporarily. Similarly, if errors are detected over a prescribed number of successive frames, the communications are suspended and started again after a random time period according to the methods described in the previous embodiments. If errors are detected in succession over N frames, the symbol placement determination unit 112 suspends the symbol placement operations for a while.

Although the invention has been described based on the example of an OFDM transmitter/receiver, the invention is applicable to a CDMA transmitter/receiver and a TDMA transmitter/receiver.

In the inverse fast Fourier transform (IFFT) operation in OFDM, sine waves of different cycles are multiplied. In place of such symbol sequences, spread codes such as M-sequences or gold sequences may be used in application to CDMA.

By realizing user multiplication in the time domain, instead of frequency domains in OFDM, the invention can be applied to TDMA.

In the above-descried embodiments, subcarriers are identified by spread codes in CDMA, and subcarriers are regarded as cyclically allocated time slots in TDMA.

The system may be designed such that all the mobile terminals use the same pilot signal sequence, or alternatively, such that a pilot signal sequence is selected at random from multiple pilot signal sequences determined in advance.

Although in the embodiments pilot signals of different users are orthogonalized by placing pilot signals of different users on different subcarriers, they may be orthogonalized using spread codes.

According to the embodiments, new users are allowed to start communications under the situation where other users are already in communication. The system employs a frame structure in which multiple pairs of mobile terminals already in communication are synchronized with each other, and in which pilot symbols are orthogonalized between different users while providing null symbols at pilot symbol positions for a new user. This arrangement allows easy detection of a new user having started communicating, and can prevent degradation of accuracy in channel estimation.

In addition, upon detecting a new user having started communicating, a mobile terminal already in communication reduces the number of currently used subcarriers to allow the new user to perform radio communication, while keeping the interference below a prescribed level.

According to the embodiments, signal collision can be avoided in the pilot section even if a new user has started communication. Consequently, the receiving characteristic can be improved when combining packets in retransmission of data signals.

According to the embodiment, multiple transmitters share the same frequency band in a self-distributed manner, while reducing delay and increasing the communication capacity of the system as a whole.

Even if interfering waves exist, the channel estimation accuracy can be maintained high.

Although the embodiments have been described using a 16-subcarrier and 4-spatial multiplexing example, other suitable configurations may be employed.

The transmitter and the transmission control method of the present invention can be applied to an arbitrary mobile communication system operating in the random access communication environment.

This patent application is based on and claims the benefit of the earlier filing date of Japanese Patent Application No. 2005-058086 filed Mar. 2, 2005, the entire contents of which are hereby incorporated by reference.

What is claimed is:

1. A transmitter comprising:
   a frequency utilization status detector configured to detect utilization status of an allocated frequency band based on a received signal;
   a symbol placement determination unit configured to determine placement of pilot symbols based on the detected status of the frequency utilization;
   a symbol placement unit configured to place the pilot symbols according to the determined symbol placement; and
   a synchronization timing detector configured to detect a synchronization timing based on the received signal,
   wherein the frequency utilization status detector detects the utilization status of the allocated frequency band based on the synchronization timing.

2. The transmitter of claim 1, wherein when receiving signals from transmitters belonging to other communication groups, the synchronization timing detector detects a sync signal from a transmitter belonging to a communication group with a highest power level.

3. The transmitter of claim 1, wherein upon receiving signals from transmitters belonging to other communication groups, the synchronization timing detector detects a sync signal from a transmitter belonging to a communication group with the fewest users.

4. The transmitter of claim 1, further comprising:
a transmission timing control unit configured to control transmission timing based on the detected synchronization timing so as to insert a non-transmission section every prescribed number of frames.

5. The transmitter of claim 1, wherein the symbol placement determination unit determines placement of the pilot symbols at prescribed subcarrier intervals.

6. The transmitter of claim 5, wherein the symbol placement determination unit changes the subcarrier interval to a value determined by adding one to a number of simultaneously accessing users.

7. The transmitter of claim 6, wherein the symbol placement determination unit changes the subcarrier interval after a prescribed number of frames have passed since a new transmitter started communicating.

8. The transmitter of claim 6, wherein the symbol placement determination unit changes the subcarrier interval according to a time determined through negotiation with a new transmitter.

9. The transmitter of claim 6, wherein the symbol placement determination unit changes the subcarrier interval to a value represented by $2^n$, where n is an integer, and greater than a number determined by adding one to a number of spatial multiplexing streams.

10. The transmitter of claim 1, wherein the symbol placement determination unit shifts a pilot symbol position to a one-subcarrier lower position when an unused subcarrier position is lower than the currently used subcarrier position.

11. The transmitter of claim 1, wherein the frequency utilization status detector is further configured to detect at least one of an interference power level and a number of spatial multiplexing streams as the utilization status of the allocated frequency band.

12. The transmitter of claim 11, further comprising:
a subcarrier block determination unit configured to select a subcarrier block to be used from among multiple subcarrier blocks determined by dividing the allocated frequency band, based on the utilization status of the allocated frequency band;
wherein the symbol placement determination unit determines placement of the pilot symbols for the selected subcarrier block.

13. The transmitter of claim 12, wherein the subcarrier block determination unit selects the subcarrier block to be used from among prescribed subcarrier blocks.

14. The transmitter of claim 12, wherein the subcarrier block determination unit selects the subcarrier block to be used such that a size of unused subcarrier blocks becomes the maximum.

15. The transmitter of claim 12, wherein the subcarrier block determination unit reduces a size of the subcarrier block to be used when the number of spatial multiplexing streams will differ between lower-level subcarrier blocks under the subcarrier block to be used.

16. The transmitter of claim 15, wherein the subcarrier block determination unit determines to use a subcarrier block on a higher frequency side when the leading pilot symbol is using a subcarrier located at a frequency higher than the lower-most frequency.

17. The transmitter of claim 12, wherein the symbol placement determination unit determines to place pilot symbols in subcarriers covering one or more transmitters depending on a size of the subcarrier block to be used.

18. The transmitter of claim 12, wherein when the number of spatial multiplexing streams exceeds a prescribed level in at least a part of subcarrier blocks to be used, the subcarrier block determination unit determines to stop using the subcarrier blocks with an excessive number of spatial multiplexing streams.

19. The transmitter of claim 18, wherein the subcarrier block determination unit determines to stop using the subcarrier blocks with the excessive number of spatial multiplexing streams, based on at least one of the number of subcarriers being used and subcarrier frequencies to which the pilot symbols are placed.

20. The transmitter of claim 12,
wherein the frequency utilization status detector detects the utilization status of an adjacent subcarrier block, in addition to the utilization status of a currently used subcarrier block; and
wherein the subcarrier block determination unit selects the adjacent subcarrier block depending on the utilization status of the adjacent subcarrier block.

21. The transmitter of claim 20, wherein the subcarrier block determination unit selects the adjacent subcarrier block when a subcarrier interval of the currently used subcarrier block is less than the subcarrier interval of the adjacent subcarrier block with a difference of two or more, and when positions of empty subcarriers in the adjacent subcarrier block correspond to the positions in the currently used subcarrier block.

22. The transmitter of claim 20, wherein the subcarrier block determination unit estimates a throughput to be obtained when the currently used subcarrier block and the adjacent subcarrier block are used, compares the estimation result with a throughput obtained using a currently used subcarrier band, and selects the adjacent subcarrier block depending on the comparison result.

23. The transmitter of claim 1, wherein the symbol placement determination unit stops placement of the pilot symbols if a measured interference power level exceeds a threshold level over N successive frames, where N is an integer, or if an error is detected over N successive frames.

24. A transmission control method comprising:
receiving a signal from a transmitter that is currently conducting radio communications nearby;
detecting the utilization status of an allocated frequency band based on the received signal;
determining placement of pilot symbols based on the detected utilization status;
placing the pilot symbols based on the determination result; and
detecting a synchronization timing based on the received signal, the detection of the utilization status of the allocated frequency band being carried out based on the synchronization timing.

* * * * *